US011934631B2

(12) United States Patent
Zhou et al.

(10) Patent No.: US 11,934,631 B2
(45) Date of Patent: Mar. 19, 2024

(54) MULTIMEDIA DATA PROCESSING METHOD, APPARATUS, ELECTRONIC DEVICE AND STORAGE MEDIUM

(71) Applicant: BEIJING BYTEDANCE NETWORK TECHNOLOGY CO., LTD., Beijing (CN)

(72) Inventors: Chenman Zhou, Beijing (CN); Yujie Li, Beijing (CN); Pingfangzi Ai, Beijing (CN)

(73) Assignee: BEIJING BYTEDANCE NETWORK TECHNOLOGY CO., LTD. (CN)

(*) Notice: Subject to any disclaimer, the term of this patent is extended or adjusted under 35 U.S.C. 154(b) by 4 days.

(21) Appl. No.: 17/441,280

(22) PCT Filed: Jul. 22, 2021

(86) PCT No.: PCT/CN2021/107876
§ 371 (c)(1),
(2) Date: Sep. 20, 2021

(87) PCT Pub. No.: WO2022/077996
PCT Pub. Date: Apr. 21, 2022

(65) Prior Publication Data
US 2022/0317860 A1    Oct. 6, 2022

(30) Foreign Application Priority Data
Oct. 16, 2020  (CN) .......................... 202011112390.3

(51) Int. Cl.
*G06F 3/048*    (2013.01)
*G06F 3/04817*  (2022.01)
(Continued)

(52) U.S. Cl.
CPC ........ *G06F 3/04817* (2013.01); *G06F 3/0482* (2013.01); *G06F 3/04845* (2013.01);
(Continued)

(58) Field of Classification Search
CPC ............................ G06F 3/04817; G06F 3/048
See application file for complete search history.

(56) References Cited

U.S. PATENT DOCUMENTS 11,095,924 B1 *  8/2021  Chee ....................... H04W 4/10
2011/0115874 A1  5/2011  Chang et al.
(Continued)

FOREIGN PATENT DOCUMENTS

CN    106357982 A    1/2017
CN    108769561 A    11/2018
(Continued)

OTHER PUBLICATIONS

Benetti et al., Open_source_management_for_multimedia_contents; 2023, IEEE, 5 pages.*
(Continued)

*Primary Examiner* — Linh K Pham

(57) ABSTRACT

The embodiment of the present disclosure discloses multimedia data processing method, apparatus, electronic device, and storage medium. The method comprises: displaying a first shooting page which includes a first icon; displaying identification information of one or more pieces of pre-buffered multimedia data according to an operation of a user on the first icon; acquiring a publishing instruction for target multimedia data of the one or more pieces of pre-buffered multimedia data according to the identification information; and in response to the publishing instruction, publishing the target multimedia data to a network. Due to the fact that the user usually enters the shooting page when wanting to share multimedia data through a terminal, therefore the user can see a draft browsing entrance more intuitively and publish a draft to the network by directly displaying the draft browsing entrance in the shooting page, and the probability of the draft being successfully published is increased. Therefore, (Continued)

the user is prevented from continuously creating new multimedia data when sharing the multimedia data, so that the user experience is improved.

17 Claims, 11 Drawing Sheets

(51) Int. Cl.
  *G06F 3/0482* (2013.01)
  *G06F 3/04845* (2022.01)
  *H04N 23/63* (2023.01)

(52) U.S. Cl.
  CPC .............. *G06F 2203/04803* (2013.01); *G06F 2203/04804* (2013.01); *H04N 23/631* (2023.01)

(56) References Cited

U.S. PATENT DOCUMENTS

| | | | | |
|---|---|---|---|---|
| 2019/0173814 | A1* | 6/2019 | McNeill | H04L 51/56 |
| 2019/0394149 | A1* | 12/2019 | McNeill | H04L 51/56 |
| 2020/0413162 | A1* | 12/2020 | Hao | H04N 21/4788 |
| 2021/0274106 | A1 | 9/2021 | Liu et al. | |

FOREIGN PATENT DOCUMENTS

| | | | | |
|---|---|---|---|---|
| CN | 108900791 A | | 11/2018 | |
| CN | 108965705 A | | 12/2018 | |
| CN | 109660739 A | | 4/2019 | |
| CN | 111324249 A | * | 6/2020 | ........... G06F 3/0481 |
| CN | 111371988 A | | 7/2020 | |
| CN | 112230812 A | | 1/2021 | |
| EP | 3674899 A1 | | 7/2020 | |
| EP | 4109878 A1 | | 12/2022 | |
| WO | 2017163238 A1 | | 9/2017 | |
| WO | 2020015332 A1 | | 1/2020 | |
| WO | 2020125292 A1 | | 6/2020 | |

OTHER PUBLICATIONS

Chinese Patent Application No. 202011112390.3, First Office Action dated Sep. 2, 2021, 14 pages with English Translation.
International Application No. PCT/CN2021/107876, International Search Report and Written Opinion dated Oct. 28, 2021, 9 pages.
Extended European Search Report dated Jan. 11, 2024 in European Application No. 21879043.4 (11 pages).

* cited by examiner

MULTIMEDIA DATA PROCESSING METHOD, APPARATUS, ELECTRONIC DEVICE AND STORAGE MEDIUM

CROSS-REFERENCE TO RELATED APPLICATIONS

The present application is a U.S. 371 Application of International Patent Application No. PCT/CN2021/107876, filed on 22 Jul. 2021, which application is based on and claims priority to China Patent Application No. 202011112390.3, filed on Oct. 16, 2020, the disclosures of which are incorporated by reference herein in their entireties.

TECHNICAL FIELD

The present disclosure relates to the field of multimedia technology, and in particular to a multimedia data processing method, an apparatus, an electronic device, and a storage medium.

BACKGROUND

With the development of communication technology and computer technology, terminal devices have more and more functions. For example, terminal devices may be installed with various different types of Application (APP) programs. Different types of APPs can provide users with different types of services.

Among them, video category APPs are relatively common APPs. Users can create multimedia data through video category APPs and share the created multimedia data with other users for viewing.

In related technologies, if multimedia data is not successfully shared, the multimedia data can be buffered in these video category APPs, and the multimedia data buffered in these video category APPs can be donated as a draft. Over time, the number of drafts buffered by a user will be increasing. This brings a lot of inconvenience to users when publishing previously buffered drafts, and even sometimes users need to continuously create new multimedia data when sharing multimedia data, thereby degrading user experience.

SUMMARY

In order to solve above technical problems or at least partially solve above technical problems, embodiments of the present disclosure provide a multimedia data processing method, apparatus, electronic device, and storage medium.

An embodiment of the present disclosure provides a multimedia data processing method, comprising:
displaying a first shooting page which includes a first icon;
displaying identification information of one or more pieces of pre-buffered multimedia data according to an operation of a user on the first icon;
acquiring a publishing instruction for target multimedia data of the one or more pieces of pre-buffered multimedia data according to the identification information; and
in response to the publishing instruction, publishing the target multimedia data to a network.

An embodiment of the present disclosure further provides a multimedia data processing apparatus, comprising:
a display module for displaying a first shooting page which includes a first icon; and displaying identification information of one or more pieces of pre-buffered multimedia data according to an operation of a user on the first icon;
an acquisition modul for acquiring a publishing instruction for target multimedia data of the one or more pieces of pre-buffered multimedia data according to the identification information; and
a sending module for publishing the target multimedia data to a network in response to the publishing instruction.

An embodiment of the present disclosure further provides an electronic device, which comprises:
one or more processors; and
a storage for storing one or more programs;
the one or more programs, when executed by the one or more processors, causing the one or more processors to implement one or more steps in the multimedia data processing method as described above.

An embodiment of the present disclosure further provides a computer-readable storage medium having a computer program stored thereon which, when executed by a processor, implements one or more steps of the multimedia data processing method described above.

An embodiment of the present disclosure further provides a computer program comprising instructions which, when executed by a processor, cause the processor to perform one or more steps of the multimedia data processing method described above.

An embodiment of the present disclosure further provides a computer program product comprising instructions which, when executed by a processor, cause the processor to perform one or more steps of the multimedia data processing method described above.

BRIEF DESCRIPTION OF THE DRAWINGS

The above and other features, advantages, and aspects of embodiments of the present disclosure will become more apparent in conjunction with the accompanying drawings and with reference to the following detailed description. Throughout the drawings, the same or similar reference signs indicate the same or similar elements. It should be understood that the drawings are schematic and the originals and elements are not necessarily drawn to scale.

DETAILED DESCRIPTION

Figure 1:
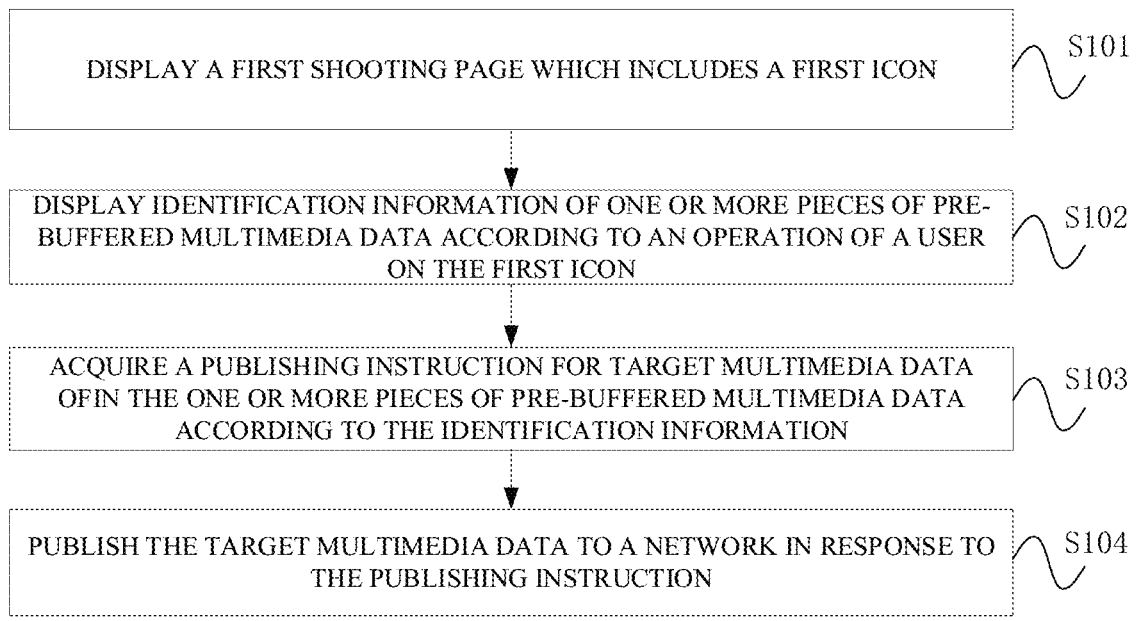
FIG. 1 is a flowchart of a multimedia data processing method in an embodiment of the disclosure.

Hereinafter, embodiments of the present disclosure will be described in more detail with reference to the accompanying drawings. Although some embodiments of the present disclosure are shown in the drawings, it should be understood that the present disclosure can be implemented in many different forms, which should not be construed as being limited to embodiments set forth herein, rather, these embodiments are provided for a more thorough and complete understanding of the present disclosure. It should be understood that the drawings and embodiments of the present disclosure should be explained as merely illustrative, and not as a limitation to the protection scope of the present disclosure.

It should be understood that various steps recited in the method embodiments of the present disclosure may be executed in a different order, and/or executed in parallel. In addition, the method implementations may include additional steps and/or omit to perform illustrated steps. The scope of the present disclosure is not limited in this respect.

The term "including" and its variants as used herein are open includes, that is, "including but not limited to". The term "based on" means "based at least in part on." The term "one embodiment" means "at least one embodiment"; the term "another embodiment" means "at least one additional embodiment"; the term "some embodiments" means "at least some embodiments." Related definitions of other terms will be given in following description.

It should be noted that the concepts of "first" and "second" etc. mentioned in the present disclosure are only used to distinguish between different apparatus, modules or units, and are not used to limit the order of functions performed by these apparatus, modules or units or their interdependence.

It should be noted that modifiers of "one" and "a plurality of" mentioned in the present disclosure are illustrative and not restrictive, and those skilled in the art should understand that they should be construed as "one or more" unless the context clearly indicates otherwise.

The names of messages or information interacted between a plurality of apparatus in the embodiments of the present disclosure are only used for illustration, and are not used to limit the scope of these messages or information.

The embodiments of the present disclosure provide a multimedia data processing method, apparatus, electronic device, and storage medium to increase the amount of multimedia data successfully shared from drafts.

Compared with related technologies, the technical solutions provided by embodiments of the present disclosure have at least following advantages: the multimedia data processing method provided by an embodiment of the present disclosure, by displaying a first icon in a first shooting page, because the first icon can be used as an entrance for a user to browser a draft, therefore, according to an operation of the user on the first icon, identification information of one or more draft, that is, identification information of multimedia data pre-buffered in a storage space of a application program or a terminal and failed to be published by the application program in historical time, can be displayed in a user interface. Further, according to the operation of the user on identification information of a target multimedia data, a publishing instruction from the user for the target multimedia data is acquired, and according to the publishing instruction, the target multimedia data is published to a network. Due to the fact that the user usually enters the shooting page when wanting to share multimedia data through the terminal, therefore, compared to setting the draft browsing entrance on a personal homepage in related technologies, by directly displaying the draft browsing entrance in the shooting page, the user can see the draft browsing entrance more intuitively when wanting to share the multimedia data and publish the draft to the network, which increases the probability of the draft being successfully published. Since the draft may be multimedia data that the user has already created, by increasing the probability of the draft being successfully published, the user is prevented from continuously creating new multimedia data when sharing the multimedia data, so that the user experience is improved.

FIG. 1 is a flowchart of a multimedia data processing method in an embodiment of the disclosure. This embodiment can be applied to a case of performing multimedia data processing in a client. The method can be performed by a multimedia data processing apparatus, which may be implemented in software and/or hardware, and the apparatus can be configured in an electronic device, such as a terminal, comprising but not limited to a smart phone, a handheld computer, a tablet, a wearable device with a display, a desktop computer, a notebook, an all-in-one computer, a smart home equipment, etc. Alternatively, this embodiment can be applied to a case of performing multimedia data processing in a server. The method can be performed by a multimedia data processing apparatus, which can be implemented in software and/or hardware, and the apparatus can be configured in an electronic device, for example, a server.

As shown in FIG. 1, the method may specifically comprise:

S101. Displaying a first shooting page which includes a first icon.

Figure 2:
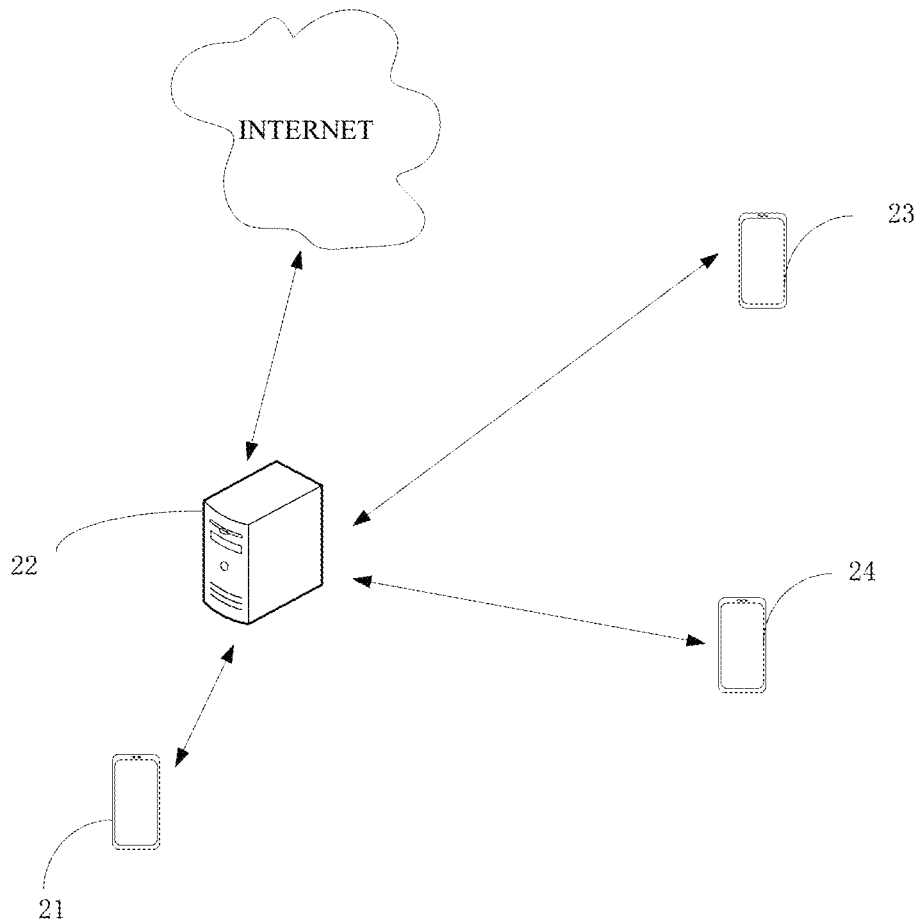
FIG. 2 is a schematic diagram of an application scenario in an embodiment of the disclosure.

Specifically, this embodiment uses a terminal as an example to introduce a multimedia data processing method, and the multimedia data processing method can be applied to an application scenario shown in FIG. 2. For example, a terminal 21 can communicate and interact with a server 22, and the server 22 can be connected to the Internet. In addition, the server 22 may also communicate and interact with other terminals, and the other terminals may be, for example, terminal 23 and terminal 24. Specifically, the terminal 21 is provided locally with a shooting apparatus, such as a camera, or the terminal 21 may be communicatively connected with a camera, which can be used to collect image data or video data. In addition, the terminal 21 can also acquire image data or video data from the Internet or other terminals through the server 22.

In an embodiment of the present disclosure, a user of the terminal 21 can share multimedia data to other users for viewing through the terminal 21. For example, the terminal 21 may be installed with various application programs, for example, video category APPs, and the user of the terminal 21 may share multimedia data to other users for viewing through the application programs in the terminal 21. Alternatively, a storage space of the terminal 21 may be pre-stored with multimedia data, and the terminal 21 may share the pre-stored multimedia data in the storage space with other users for viewing. It can be understood that the storage space of the terminal 21 is not limited herein, for example, it may be a memory, a buffer area, and the like.

In some embodiments, the multimedia data includes at least one of image data, video data, audio data, and text data. For example, the multimedia data shared through the terminal 21 may include image data or video data collected by a local shooting apparatus, such as a camera, of the terminal 21. In addition, the multimedia data may also include audio data, text data, and the like. Alternatively, the multimedia data shared by the terminal 21 may include at least one of image data, video data, audio data, and text data acquired by the terminal 21 from the Internet or other terminals. In some other embodiments, the multimedia data shared through the terminal 21 may also be multimedia data obtained after appropriate editing on the basis of the image data or video data collected by the local camera of the terminal 21, or the multimedia data shared through the terminal 21 may also be multimedia data obtained after appropriate editing on the basis of the image data or video data acquired by the terminal 21 from the Internet or other terminals.

In some application scenarios, a user may have selected multimedia data to be shared, but during sharing operation, due to some reasons, the multimedia data is not successfully published and shared. In this case, the terminal 21 can buffer the multimedia data in a storage space of the application program or the terminal 21, and the multimedia data buffered in the storage space of the application program or the terminal 21 can be donated as drafts. Over time, the amount of drafts will be increasing. The multimedia data processing method described in this embodiment can perform processing for multimedia data, that is, drafts, pre-buffered in the storage space of the application program or the terminal 21, or the multimedia data processing method described in this embodiment can also perform processing for multimedia data of non-drafts.

Figure 3:
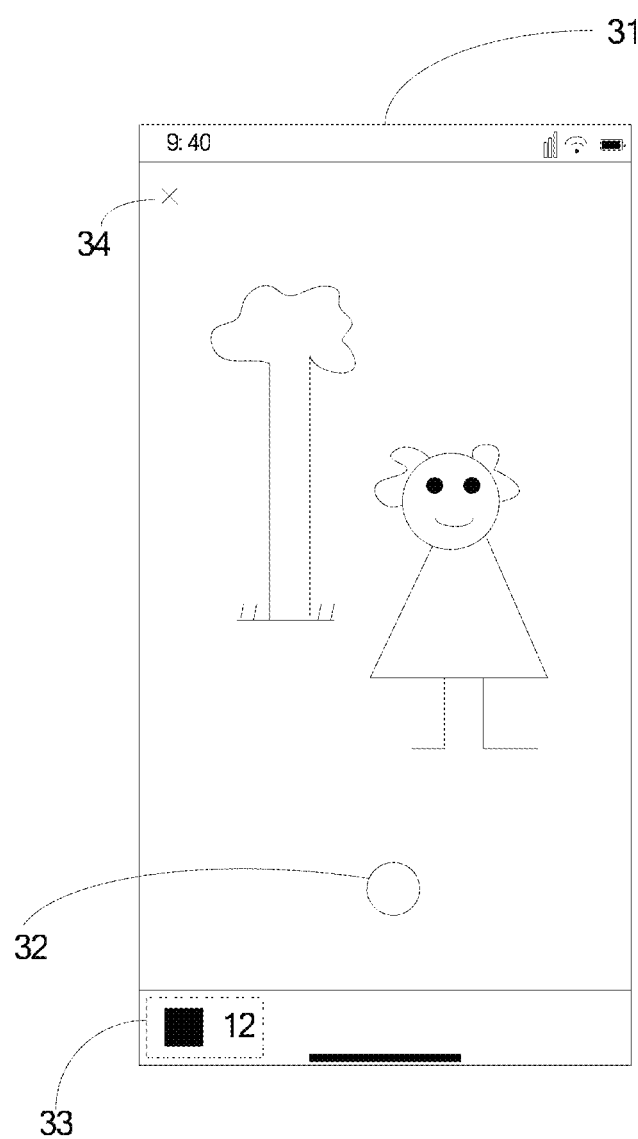
FIG. 3 is a schematic diagram of a user interface in an embodiment of the disclosure.

The number 31 as shown in FIG. 3 represents a shooting page when the terminal 21 calls the camera of the terminal 21 to shoot, which is donated as a first shooting page.

In some embodiments, the first shooting page may also display a target image collected by a shooting apparatus. In some embodiments, the target image changes in real time.

For example, the first shooting page 31 displays a target image collected by a camera of the terminal 21. In the case that the camera is a front camera of the terminal 21, the target image collected by the camera may be the user's face. In the case that the camera is a rear camera of the terminal 21, the target image collected by the camera may be a scene around the terminal 21. In addition, since target images collected by a camera at different times may be different, the target image collected by the camera displayed in the first shooting page 31 may change in real time. In addition, as shown in FIG. 3, the first shooting page 31 also includes a shooting control button 32. The user can operate on the shooting control button 32. This embodiment does not have specifically limitation on the operation, for example, it can be a tap, a long press, a double tap, a voice control instruction, a gesture control instruction, and the like. For example, the terminal 21 may capture image data or video data according to an operation of the user on the capture control button 32.

In addition, in this embodiment, the first shooting page 31 may further include a first icon 33 as shown in FIG. 3, and the first icon 33 may specifically be a draft browsing entrance, which is an entrance for a user to browse drafts. That is to say, a draft, that is, multimedia data pre-buffered in a storage space of an application program or the terminal 21 and failed to be published and shared in historical time, can be acquired through the first icon 33. It is understood that the first shooting page 31 shown in FIG. 3 is only illustrative, and the first shooting page 31 may also include other icons, keys, or buttons, for example, the first shooting page 31 may also include a close button 34, and the terminal 21 can close the first shooting page 31 according to the operation of the user on the close button 34.

In some embodiments, the first icon includes the total amount of the pre-buffered multimedia data. For example, the number 12 included in the first icon 33 shown in FIG. 3 represents the total amount of pre-buffered drafts in a storage space of the application program or the terminal 21. In addition, the present disclosure does not limit the set position of the number which representing the total amount of multimedia data pre-buffered, for example, the number may also be set at the upper right position of the icon and so on.

S102. Displaying identification information of one or more pieces of pre-buffered multimedia data according to an operation of a user on the first icon.

Specifically, the user can operate on the first icon 33, and the specific operation is not limited here, for example, it can be a tap, a long press, a double tap, a voice control instruction, a gesture control instruction, and so on. The terminal 21 can display the identification information of one or more multimedia data pre-buffered in a storage space of the application program or the terminal 21 in a user interface according to the operation of the user on the first icon 33. Wherein, in the case that the multimedia data includes image data, the identification information of the multimedia data may include a thumbnail corresponding to the image data or a partial image of the image data. In the case that the multimedia data includes video data, the identification information of the multimedia data may include a cover image of the video data or a partial image of the cover image, wherein, this embodiment does not have specific limitation on the cover image, for example, the cover image can be an image associated with a certain frame or several frames of the video data. Alternatively, the cover image can be any frame image in the video data. In the case that the multimedia data includes audio data, the identification information of the multimedia data may include a name of the audio data, such as a music name. In the case that the multimedia data includes text data, the identification information of the multimedia data may include an abstract or title of the text data.

In this embodiment, one piece of multimedia data can correspond to one piece of identification information. It is understood that the number of identification information of the multimedia data displayed in the user interface of the terminal 21 according to the operation of the user on the first icon 33 can be equal to the total amount of drafts, that is, the terminal 21 can display identification information of all drafts in the user interface. Alternatively, the number of identification information of the multimedia data displayed in the user interface of the terminal 21 is less than the total amount of drafts, that is, the terminal 21 can display the identification information of a part of drafts in the user interface. For example, a total of 12 drafts are buffered in the storage space of the application program or the terminal 21. The 12 drafts can be sorted according to the chronological order of editing or shooting by the user. Further, the terminal 21 can display the identification information of the first n drafts in the sorting in the user interface according to an operation of the user on the first icon 33, wherein, the specific value of n is not limited herein, for example, it can be 3. In addition, it can be understood that, when sorting drafts, the chronological order is only one of the reference methods for sorting. For example, other sorting methods can also be included. For example, sorting can also be conducted according to identification information of drafts, such as lengths of titles.

S103. Acquiring a publishing instruction for target multimedia data of the one or more pieces of pre-buffered multimedia data according to the identification information.

For example, after the terminal 21 displays three identification information of pre-buffered multimedia data in a user interface, a user can operate on any one of the three identification information, such as click, double-click, long-press, voice control instruction, gesture control instruction, etc. Wherein, the identification information operated by the user can be donated as target identification information. Further, the terminal 21 can acquire a publishing instruction from the user for the target multimedia data corresponding to the target identification information according to an operation of the user on the target identification information.

S104. Publishing the target multimedia data to a network in response to the publishing instruction.

In response to the publishing instruction for the target multimedia data, the terminal 21 releases the target multimedia data to a network, that is, shares the target multimedia data. For example, the terminal 21 can send the target multimedia data to the server 22, and the server 22 further upload the target multimedia data to the Internet, or the server 22 may send the target multimedia data through the network to other terminals, for example, terminal 23 and/or terminal 24, for users of terminal 23 and/or terminal 24 to view the target multimedia data.

It is understood that in the first shooting page 31, the terminal 21 can not only shoot new image data or video data according to an operation of the user on the shooting control button 32, thereby obtaining new multimedia data and sharing the new multimedia data, but also the terminal 21 can display identification information of one or more pieces of pre-buffered multimedia data in a storage space of the application program or the terminal 21 in the user interface according to an operation of the user on the first icon 33. Since the multimedia data pre-buffered in the storage space of the application program or the terminal 21 may be the multimedia data that the user has failed to publish and share in historical time, the terminal 21 may also acquire a publishing instruction from the user for a certain multimedia data displayed in the user interface according to an operation of the user on identification information of the multimedia data, and further successfully shares the multimedia data that the user has failed to share in historical time, according to the publishing instruction.

In the multimedia data processing method provided by an embodiment of the present disclosure, by displaying a first icon in a first shooting page, because the first icon can be used as an entrance for a user to browser a draft, therefore, according to an operation of the user on the first icon, identification information of one or more draft, that is, identification information of multimedia data pre-buffered in a storage space of a application program or a terminal and failed to be published by the application program in historical time, can be displayed in a user interface. Further, according to the operation of the user on identification information of a target multimedia data, a publishing instruction from the user for the target multimedia data is acquired, and according to the publishing instruction, the target multimedia data is published to a network. Due to the fact that the user usually enters the shooting page when wanting to share multimedia data through the terminal, therefore, compared to setting the draft browsing entrance on a personal homepage in related technologies, by directly displaying the draft browsing entrance in the shooting page, the user can see the draft browsing entrance more intuitively when wanting to share the multimedia data and publish the draft to the network, which increases the probability of the draft being successfully published. Since the draft may be multimedia data that the user has already created, by increasing the probability of the draft being successfully published, the user is prevented from continuously creating new multimedia data when sharing the multimedia data, so that the user experience is improved.

On the basis of the foregoing embodiment, displaying identification information of one or more pieces of pre-buffered multimedia data according to an operation of a user on a first icon comprises following several feasible implementations:

A feasible implementation is: displaying identification information of one or more pieces of pre-buffered multimedia data according to an operation of a user on a first icon, comprising: displaying a first list in the first shooting page according to the operation of the user on the first icon, the first list including identification information of the one or more pieces of pre-buffered multimedia data.

Figure 4:
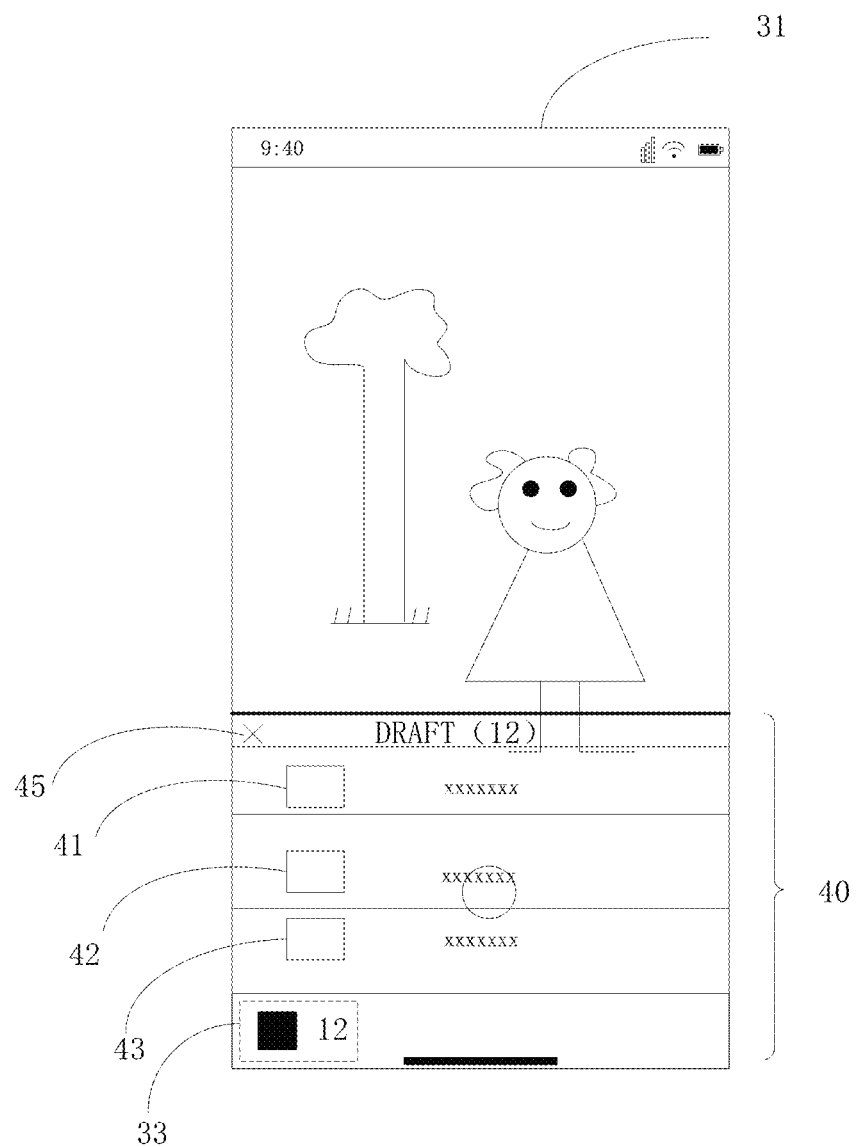
FIG. 4 is a schematic diagram of another user interface in an embodiment of the disclosure.

For example, the terminal 21 can display a first list in the first shooting page 31 according to an operation of a user on the first icon 33, the first list including identification information of one or more pieces of pre-buffered multimedia data. For example, the user interface shown in FIG. 4 is the first shooting page 31 displaying a first list, where 40 represents the first list, and the first list 40 includes three identification information of pre-buffered multimedia data, for example, 41, 42, 43 represent one identification information of pre-buffered multimedia data respectively. In addition, identification information of multimedia data may also include description information or title of the multimedia data. For example, "xxxxxxx" shown in FIG. 4 may be description information or title of multimedia data, and the description information or the title of each multimedia data may be different.

In some embodiments, the first shooting page displays a target image collected by a shooting apparatus. In some embodiments, the target image changes in real time.

For example, as shown in FIG. 4, after the first list 40 is displayed in the first shooting page 31, the first shooting page 31 may also display a target image collected by a shooting apparatus. In addition, the target image collected by the shooting apparatus may change in real time. Therefore, the target image displayed on the first shooting page 31 may also change in real time.

In some embodiments, the first list is in a preset area of the first shooting page. As shown in FIG. 4, the first list 40 is in an area of the first shooting page 31, and this area can be donated as a preset area.

In some embodiments, the first list includes a transparent area or a non-transparent area; alternatively, the first list includes a partially transparent area and a partially non-transparent area.

As shown in FIG. 4, the first list 40 may be a transparent area, that is, the first icon 33, the shooting control button 32, and a part of area in the target image etc. in the first shooting page 31 can be seen through the first list 40. For example, the first list 40 may be located in a first layer, the first shooting page 31 may be located in a second layer, and the first layer is above the second layer, and the first layer is a transparent layer. In addition, in a case that the first list 40 is a transparent area, the color of the transparent material for the first list 40 is not limited.

Figure 5:
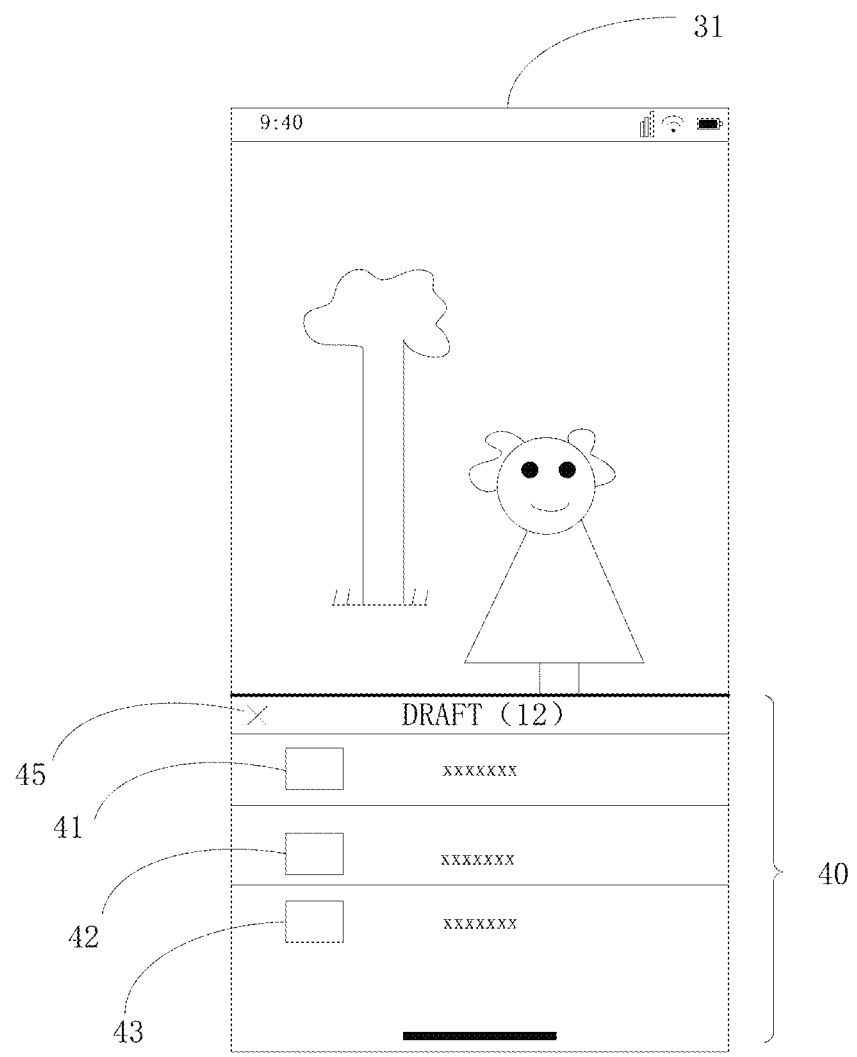
FIG. 5 is a schematic diagram of another user interface in an embodiment of the disclosure.

In some other embodiments, the first list 40 may also be a non-transparent area. As shown in FIG. 5, the first list 40 is a non-transparent area, that is, the first icon 33, the shooting control button 32, and a part of area in the target image etc. in the first shooting page 31 cannot be seen through the first list 40. In addition, in the case that the first list 40 is a non-transparent area, the color of the non-transparent material for the first list 40 is not limited, for example, it may be gray, black, white, etc. This embodiment uses white as an example for illustration.

Figure 6:
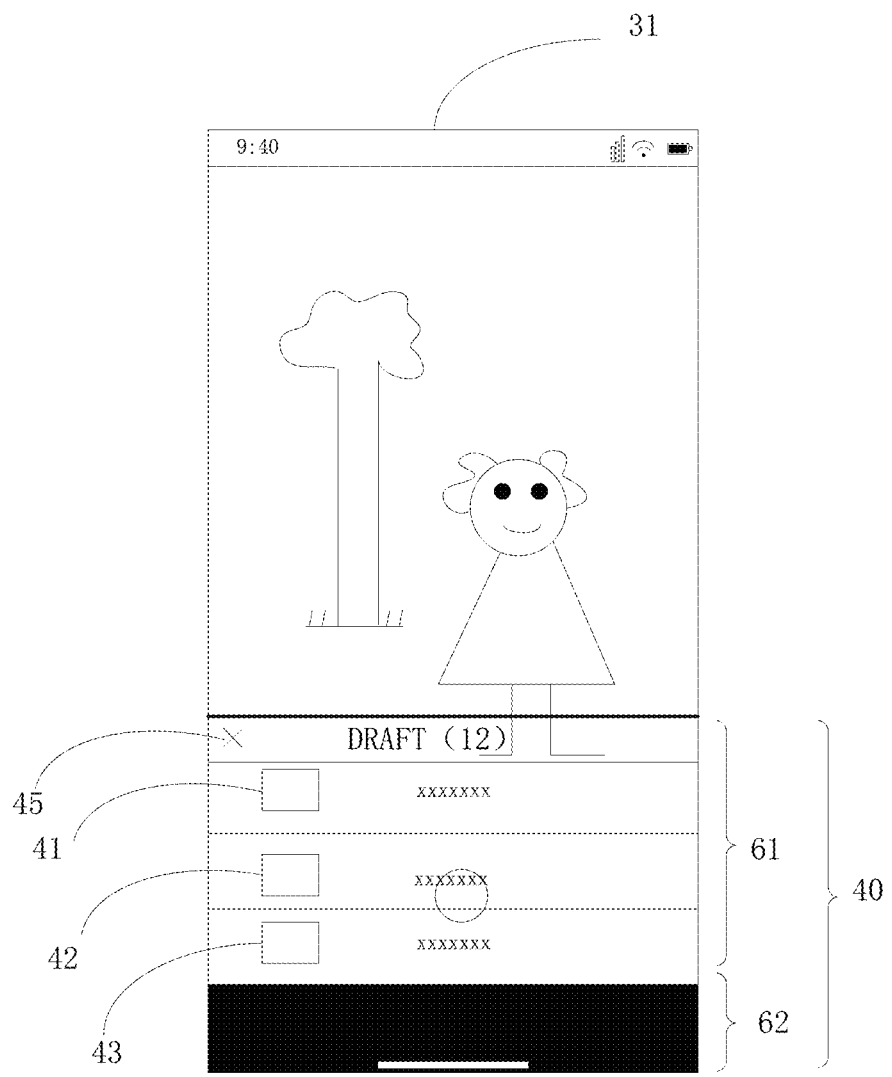
FIG. 6 is a schematic diagram of another user interface in an embodiment of the disclosure.

In some other embodiments, the first list may include a partially transparent area and a partially non-transparent area. As shown in FIG. 6, the first list 40 includes a partial area shown in 61 and a partial area shown in 62, where the partial area shown in 61 may be a transparent area, and the partial area shown in 62 may be a non-transparent area. For example, the shooting control button 32 and a part of area in the target image in the first shooting page 31 can be seen through the partial area shown in 61, while the first icon 33 in the first shooting page 31 cannot been seen through the partial area shown in 62. For example, what is presented in the non-transparent first list 40 shown in FIG. 5 is white, and what is presented in the non-transparent area 62 of the first list 40 in FIG. 6 is black, but in actual applications, the specific color of the non-transparent material is not limited.

The first list 40 shown in FIGS. 4, 5, and 6 may be a half-screen draft list. It can be understood that the color, material, transparency of the first list 40, as well as the way of displaying identification information of drafts in the first list 40 are not specifically limited in this embodiment, and the first list 40 as shown in FIGS. 4, 5, and 6 is only for illustration.

In some embodiments, the displaying a first list in the first shooting page according to an operation of a user on the first icon comprises: adjusting the brightness of the first shooting page according to the operation of the user on the first icon; displaying the first list in the first shooting page with the brightness adjusted.

Figure 7:
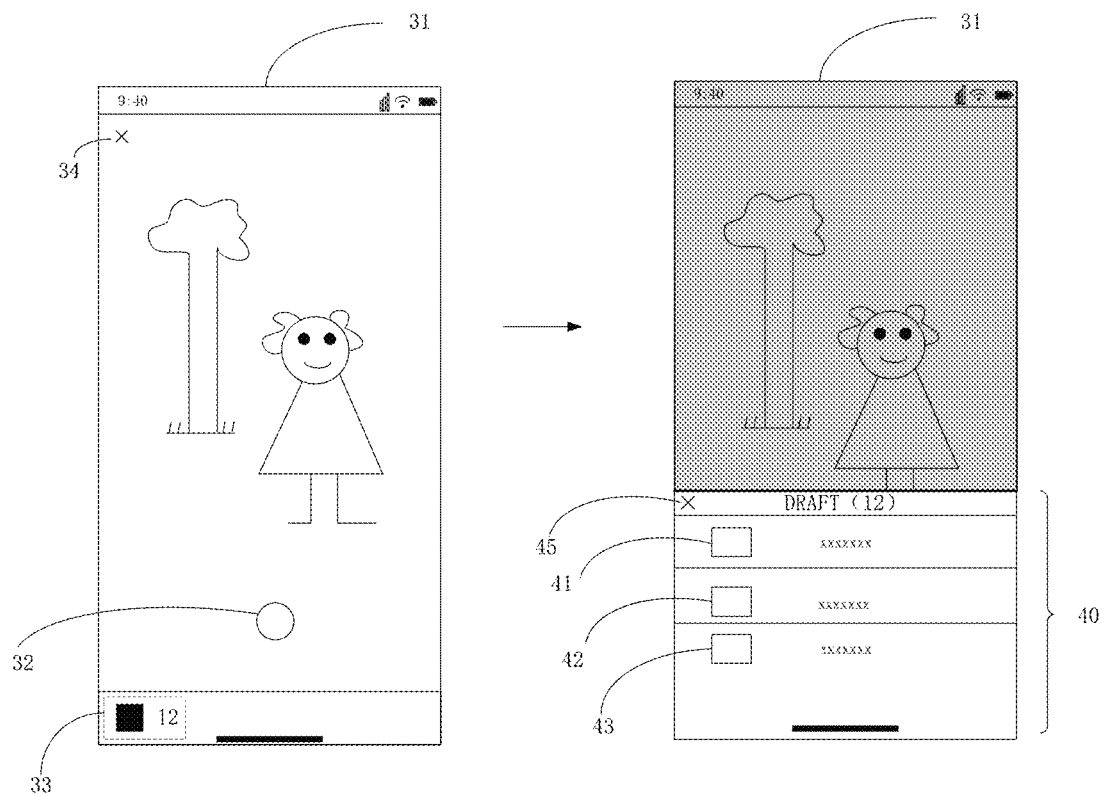
FIG. 7 is a schematic diagram of another user interface in an embodiment of the disclosure.

For example, as shown in FIG. 7, the terminal 21 can adjust the brightness of the first shooting page 31 according to the operation of the user on the first icon 33, for example, reduce the brightness of the first shooting page 31, and further display the first list in the first shooting page 31 after brightness reducing. For example, the right side shown in FIG. 7 is a schematic diagram of displaying the first list in the first shooting page 31 after brightness reducing. The first list may be, for example, any one of the first lists 40 shown in FIGS. 4, 5, and 6. Here, the first list 40 shown in FIG. 5 is taken as an example for illustration.

Another feasible implementation is: displaying identification information of one or more pieces of pre-buffered multimedia data according to an operation of a user on a first icon, comprising: acquiring a partial page of the first shooting page or performing reduction processing on the first shooting page according to the operation of the user on the first icon; displaying the first page, the first page including a first area and a second area, the first area including the partial page of the first shooting page or the first shooting page after reduction processing, the second area including a first list, the first list including identification information of the one or more pieces of pre-buffered multimedia data.

Figure 8:
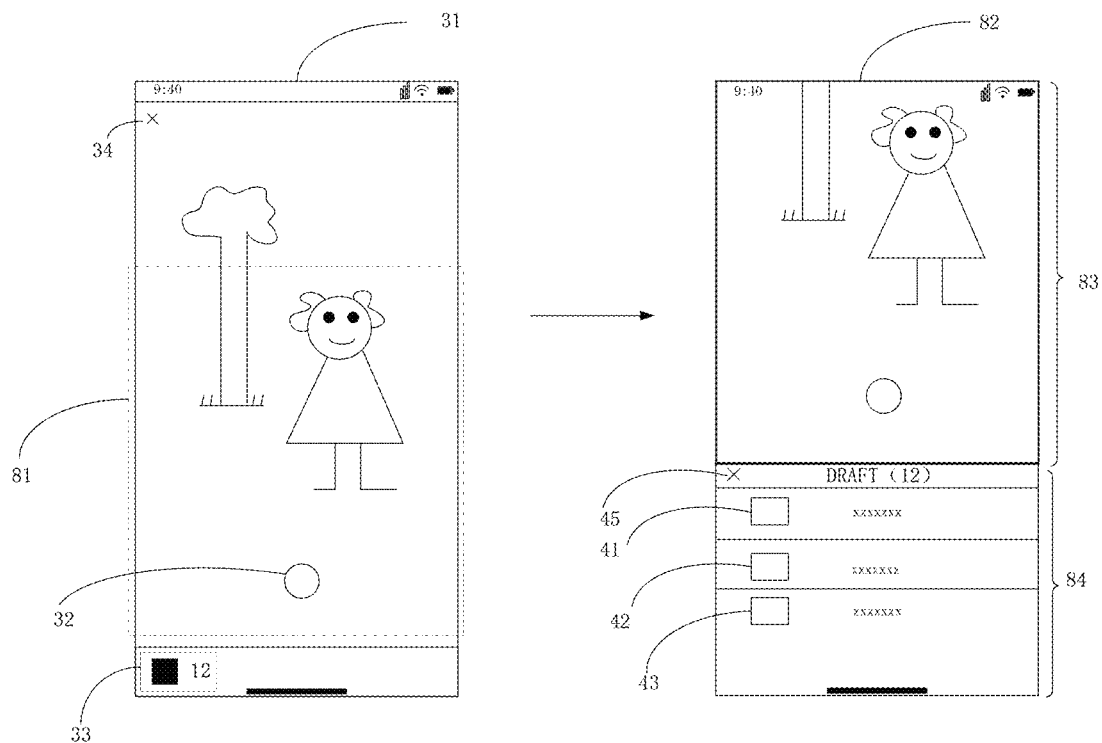
FIG. 8 is a schematic diagram of another user interface in an embodiment of the disclosure.

For example, as shown in FIG. 8, the terminal 21 can acquire a partial page of the first shooting page 31 according to the operation of the user on the first icon 33. For example, the number 81 shows a partial page of the first shooting page 31 acquired by the terminal 21 . Further, the terminal 21 can display a first page, for example, the first page 82 shown in FIG. 8. The first page 82 includes a first area 83 and a second area 84, where the first area 83 includes a partial page of the first shooting page 31 shown in 81, and the second area 84 includes a first list, which can be the first list 40 as shown in any one of FIGS. 4, 5, and 6. Here, the first list 40 as shown in FIG. 5 is taken as an example for illustration. As it can be seen from FIG. 8, by acquiring a partial page 81 of the first shooting page 31 and displaying the first page 82, it can be equivalent to moving the first shooting page 31 towards the top of the screen while opening the first list 40 according to the operation of the user on the first icon 33, thereby preventing target objects, such as persons, in the target image collected by the camera from being blocked by the first list 40, so that target objects in the target image can be displayed in the user interface more completely, and the effect of the first list 40 on the target image is reduced. In addition, in other embodiments, the terminal 21 can display the first list 40 according to the operation of the user on the first icon 33, and at the same time directly move the first shooting page 31 towards the top of the screen, thereby eliminating the process of acquiring the partial page 81.

Figure 9:
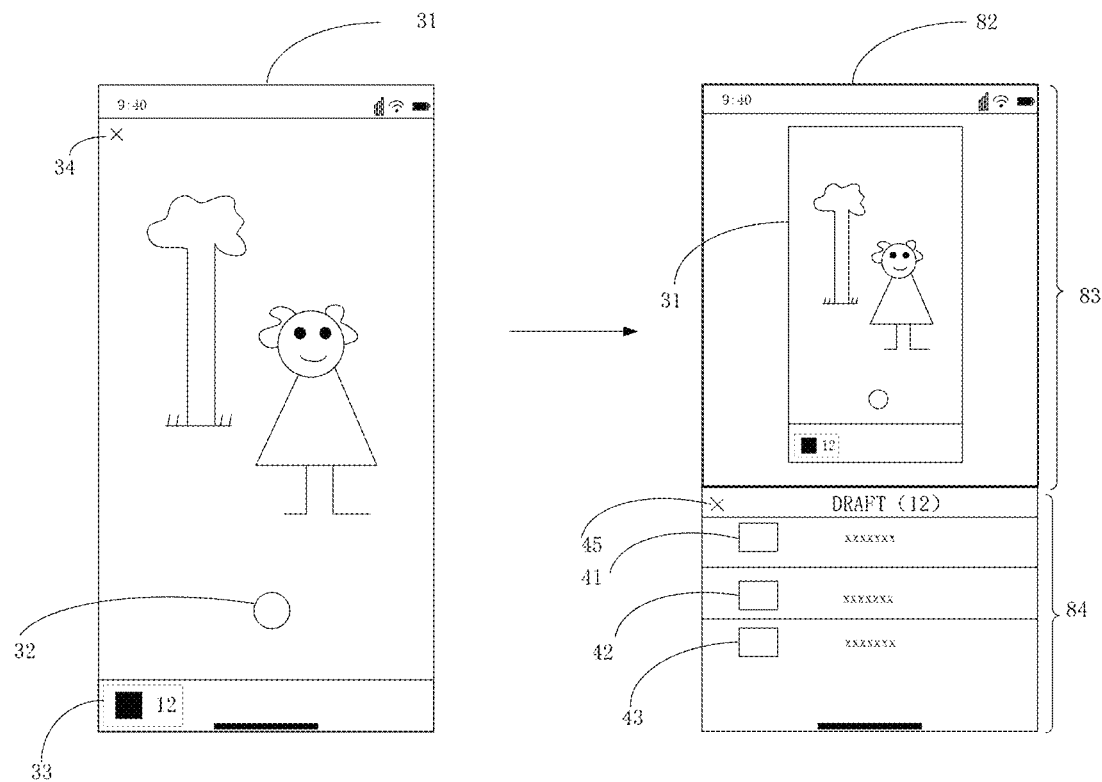
FIG. 9 is a schematic diagram of another user interface in an embodiment of the disclosure.

In addition, in order to reduce the effect of the first list 40 on the target image, another feasible implementation is, as shown in FIG. 9, the terminal 21 can perform reduction processing to the first shooting page 31 according to the operation of the user to the first icon 33 to obtain the first shooting page 31 after reduction processing. Further, the first page 82 is displayed, and the first shooting page 31 after reduction processing is displayed in the first area 83 of the first page 82, and the first list is displayed in the second area 84 of the first page 82. Similarly, the first list can be the first list 40 as shown in any one of FIGS. 4, 5, and 6. Here, the first list 40 as shown in FIG. 5 is taken as an example for illustration. It is understood that, as another feasible implementation, during reduction processing on the first shooting page 31, the first shooting page 31 may be reduced according to the size of the screen, so that it is sufficient that the first area 83 can display the target image collected by the camera completely, without the need to display the shooting control button 32 and/or the first icon 33 in the first area 83. In some embodiments, acquiring a partial page of the first shooting page or performing reduction processing on the first shooting page according to the operation of the user on the first icon comprises: adjusting the brightness of the first shooting page according to the operation of the user on the first icon; acquiring the partial page of the first shooting page with the brightness adjusted or performing reduction processing on the first shooting page.

Figure 10:
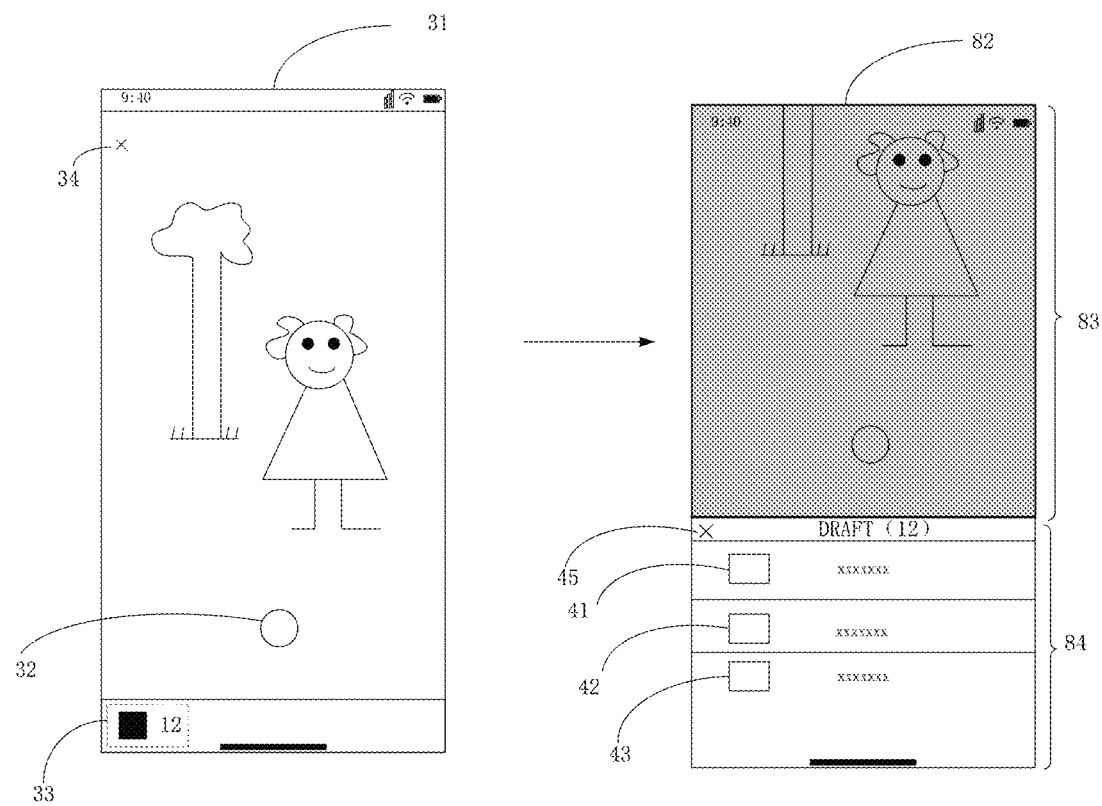
FIG. 10 is a schematic diagram of another user interface in an embodiment of the disclosure.

For example, as shown in FIG. 10, take acquiring the partial page of the first shooting page with the brightness adjusted as an example for illustration. The terminal 21 can adjust the brightness of the first shooting page 31 according to the operation of the user on the first icon 33, for example, reduce the brightness of the first shooting page 31, and acquire the partial page of the first shooting page 31 after brightness reducing. Further, the first page 82 is displayed, and the first area 83 of the first page 82 includes the partial page, and the second area 84 includes the first list, such as the first list shown in FIG. 5.

The multimedia data processing method provided by an embodiment of the present disclosure, by displaying a first list in a first shooting page, the first list including identification information of one or more pieces of pre-buffered multimedia data, improves the probability of the pre-buffered multimedia data being successfully published. In addition, by acquiring a partial page of the first shooting page, and displaying the partial page of the first shooting page and the first list in the user interface at the same time, the first list is avoided to occlude target objects in a target image collected by the camera, so that target objects in the target image are displayed in the user interface more completely. In addition, by performing reduction processing on the first shooting page, and displaying the reduced first shooting page and the first list in the user interface at the same time, the first list can be avoided to occlude the first shooting page, so that the first shooting page can be displayed in the user interface completely.

On the basis of the foregoing embodiment, the size of the first list can be fixed or can be adjustable.

In some embodiments, in the case that the size of the first list is fixed, the first list is used to display identification information of a preset number of pre-buffered multimedia data.

For example, in the foregoing FIGS. 4 to 10, the size of the first list is fixed. Specifically, the first list can display at most identification information of three pre-buffered multimedia data. When the total amount of pre-buffered multimedia data in the storage space of the application program or the terminal 21 is less than or equal to 3, the first list can display identification information of all multimedia data pre-buffered in the storage space of the application program or the terminal 21. When the total amount of pre-buffered multimedia data in the storage space of the application program or the terminal 21 is greater than three, the first list can display at most identification information of three pre-buffered multimedia data therein.

In some embodiments, the first list includes the total amount of pre-buffered multimedia data.

For example, in the foregoing FIGS. 4 to 10, the first list can also display digits of the total amount of multimedia data pre-buffered in the storage space of the application program or the terminal 21, that is, digits of the total amount of drafts, for example, "drafts (12)". The total amount is the same as the total amount of multimedia data, that is, the total amount of drafts, included in the first icon 33 as shown in FIG. 3.

In addition, in the foregoing FIGS. 4 to 10, the first list may also include a close button 45. For example, the terminal 21 can close the first list according to an operation of a user on the close button 45.

In some embodiments, in step S103 shown in FIG. 1, acquiring a publishing instruction for target multimedia data of the one or more pieces of pre-buffered multimedia data according to the identification information comprises: displaying a second page according to an operation of a user on target identification information in the first list, the second page including the target multimedia data corresponding to the target identification information and a publishing icon of the target multimedia data; receiving a publishing instruction for the target multimedia data according to an operation of the user on the publishing icon of the target multimedia data.

Figure 11:
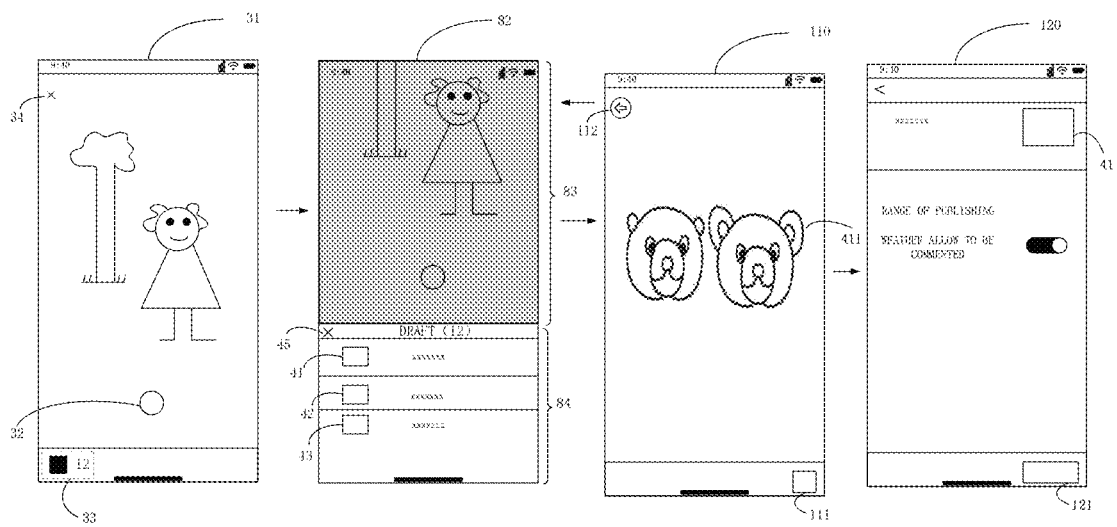
FIG. 11 is a schematic diagram of another user interface in an embodiment of the disclosure.

For example, in the foregoing FIGS. 4 to 10, the user can operate on identification information of any one of multimedia data displayed in the first list, for example, the identification information operated by the user is donated as target identification information. The terminal 21 can display a second page according to an operation of the user on the target identification information, for example, a tap, a double-click, a long press, a voice control instruction, a gesture control instruction, etc., the second page including target multimedia data corresponding to the target identification information and a publishing icon of the target multimedia data. As shown in FIG. 11, for example, on the basis of FIG. 10, the user operates on the identification information 41 in the first list, and the identification information 41 can be donated as target identification information. The terminal 21 can display the second page 110 according to an operation of the user on the identification information 41 or a preset area around the identification information 41, the second page 110 including multimedia data 411 corresponding to the identification information 41 and a publishing icon 111 of the multimedia data 411. Further, the terminal 21 can also receive a publishing instruction from the user for the multimedia data 411 according to an operation of the user on the publishing icon 111, for example, click, double-click, long-press, voice control instruction, gesture control instruction, etc., and publish the multimedia data 411 directly to a network according to the publishing instruction. Alternatively, the terminal 21 displays a publishing page 120 according to the operation of the user on the publishing icon 111. The publishing page 120 can display the identification information 41 and description information or title "xxxxxxx" of the multimedia data 411. In the publishing page 120, the user can set the range of publishing for the multimedia data 411, and set whether the multimedia data 411 is allowed to be commented, and so on. In addition, the publish page 120 may also include a confirmation button 121. The terminal 21 receives a publishing instruction from the user for the multimedia data 411 according to an operation of the users on the confirmation button 121, such as a tap, a double-click, a long-press, a voice control instruction, a gesture control instruction, etc., and publishes the multimedia data 411 to a network according to the publishing instruction. It is understood that the publishing page 120 as shown in FIG. 11 is only for illustration and is not specifically limited. For example, the publishing page 120 may also include other settable items regarding the multimedia data 411.

It is understood that the second page 110 and the publishing page 120 as shown in FIG. 11 are only for illustration, and this embodiment does not have specific limitation on the second page 110 and the publishing page 120. Specifically, the second page 110 and the publishing page 120 may also display other icons or buttons. For example, the second page 110 may also display a return button 112, and the terminal 21 returns back to the first page 82 according to an operation of the user on the return button 112, such as a tap, a double tap, a long press, a voice control instruction, a gesture control instruction, etc.

In some embodiments, the user may also edit the multimedia data 411 in the second page 110. For example, the second page 110 may also include an edit button. The terminal 21 edits the multimedia data 411 according to an operation of the user on the edit button. After the editing is completed, the edited multimedia data 411 is published to the network according to an operation of the user on the publishing icon 111. Alternatively, after the editing is completed, the publishing page 120 is displayed according to an operation of the user on the publishing icon 111, and after the user performs corresponding setting operations on the edited multimedia data 411 in the publishing page 120, further according to an operation of the user on the confirmation button 121 in the publishing page 120, the edited multimedia data 411 is published to the network.

The foregoing embodiment introduced a situation where the size of the first list is fixed, and the following describes a situation where the size of the first list is adjustable in conjunction with specific embodiments. In the case that the size of the first list is adjustable, the method further comprises: adjusting the size of the first list according to an operation of a user on the first list, the number of identification information of the pre-buffered multimedia data that can be displayed in the first list being positively correlated with the size of the first list.

Figure 12:
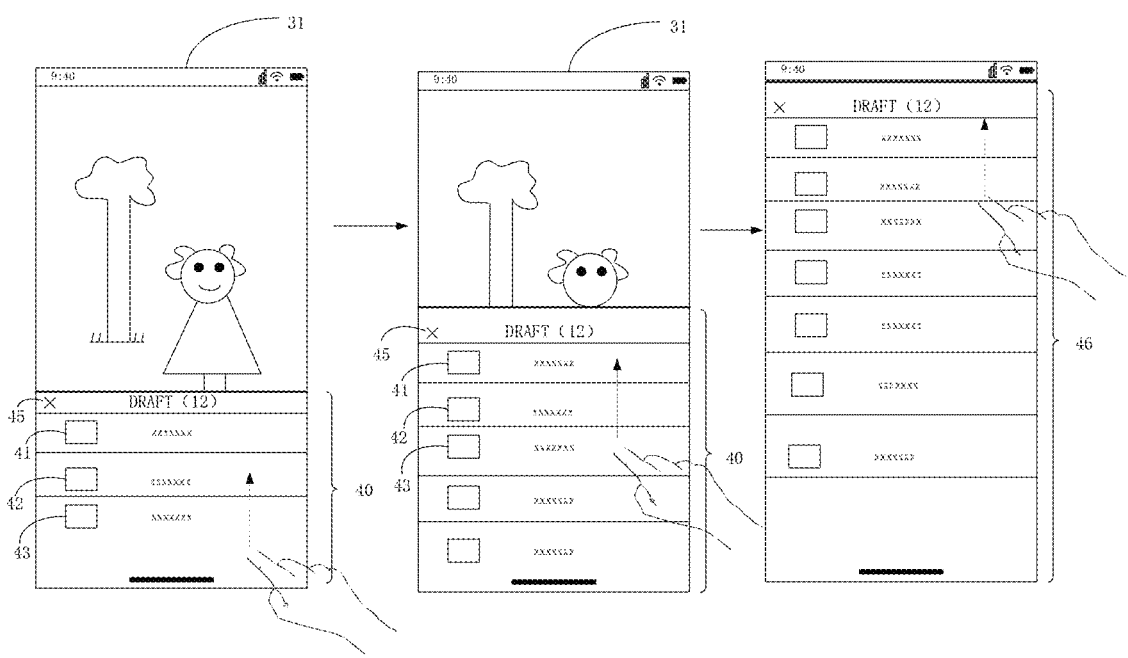
FIG. 12 is a schematic diagram of another user interface in an embodiment of the disclosure.

For example, in foregoing FIGS. 4 to 10, the size of the first list can be adjusted. For example, the user may perform a sliding operation on the first list 40, for example, sliding from the bottom of the screen to the top of the screen. The terminal 21 can adjust the size of the first list 40 according to the sliding operation of the user on the first list 40. As shown in FIG. 12, on the basis of FIG. 5, the terminal 21 can continuously increase the size of the first list 40 according to the sliding operation of the user on the first list 40, so that the number of identification information of the pre-buffered multimedia data that can be displayed in the first list 40 continues to increase. For example, in the process of the user sliding from the bottom of the screen to the top of the screen, the size of the first list 40 gradually increases, and the number of identification information of the pre-buffered multimedia data that can be displayed in the first list 40 gradually increases.

In some embodiments, acquiring a publishing instruction for target multimedia data of the one or more pieces of pre-buffered multimedia data according to the identification information in step S103 comprises: displaying a second page according to an operation of the user on the target identification information in the first list which size has been adjusted, the second page including target multimedia data corresponding to the target identification information and a publishing icon of the target multimedia data; receiving a publishing instruction for the target multimedia data according to an operation of the user on the publishing icon of the target multimedia data.

For example, on the basis of FIG. 12, the terminal 21 can display a second page according to an operation of the user on any one of identification information, such as identification information 41, in the increased first list 40. The second page may be, for example, the second page 110 as shown in FIG. 11, the second page 110 including multimedia data 411 corresponding to the identification information 41 and a publishing icon 111 of the multimedia data 411. Further, the terminal 21 can receive a publishing instruction for the multimedia data 411 according to an operation of the user on the publishing icon 111, and further publish the multimedia data 411 to a network according to the publishing instruction. Alternatively, the terminal 21 displays the publishing page 120 according to an operation of the user on the publishing icon 111. In the publishing page 120, the user can set the range of publishing for the multimedia data 411, and set whether the multimedia data 411 is allowed to be commented, and so on. In addition, the publishing page 120 may also include a confirmation button 121, and the terminal 21 publishes the multimedia data 411 to the network according to an operation of the user on the confirmation button 121.

In addition, not only the first list can be displayed in the user interface, for example, the second list can also be displayed, where the first list can be a half-screen draft list specifically, and the second list can be a full-screen draft list, specifically, comprising following several feasible implementations:

In one feasible implementation, a second list is displayed according to an operation of the user on the first list, the second list being used to display identification information of all pre-buffered multimedia data.

For example, on the basis of FIG. 12, the user continues to slide the first list 40 so that the first list 40 continues to increase. When the size of the first list 40 is consistent with the screen size, the first list 40 that is consistent with the screen size can be denoted as a second list, for example, the second list 46 shown in FIG. 12, and the second list 46 is used to display identification information of all pre-buffered multimedia data. For example, the total amount of pre-buffered multimedia data in a storage space of the application program or the terminal 21 is 12, and one page of the second list 46 can display identification information of seven pre-buffered multimedia data. Further, the user can slide the identification information of the pre-buffered multimedia data that has been displayed in the second list 46, and the terminal 21 can hide the identification information of the pre-buffered multimedia data that has been displayed according to the user's sliding operation, and display gradually or at once identification information of the remaining 5 pre-buffered multimedia data. In other words, the user can browse identification information of all the pre-buffered multimedia data in the process of sliding the second list 46.

In some embodiments, the sorting order of the multimedia data displayed in the first list and/or the second list is determined according to the chronological order.

For example, the sorting order of the identification information of the pre-buffered multimedia data displayed in the first list 40 and/or the second list 46 may be determined according to editing time of multimedia data. For example, the first list 40 can display identification information of three pre-buffered multimedia data with latest editing time.

In another feasible implementation, the first list includes a second icon; and according to an operation of the user on the second icon, a second list is displayed, the second list being used to display identification information of all pre-buffered multimedia data.

Figure 13:
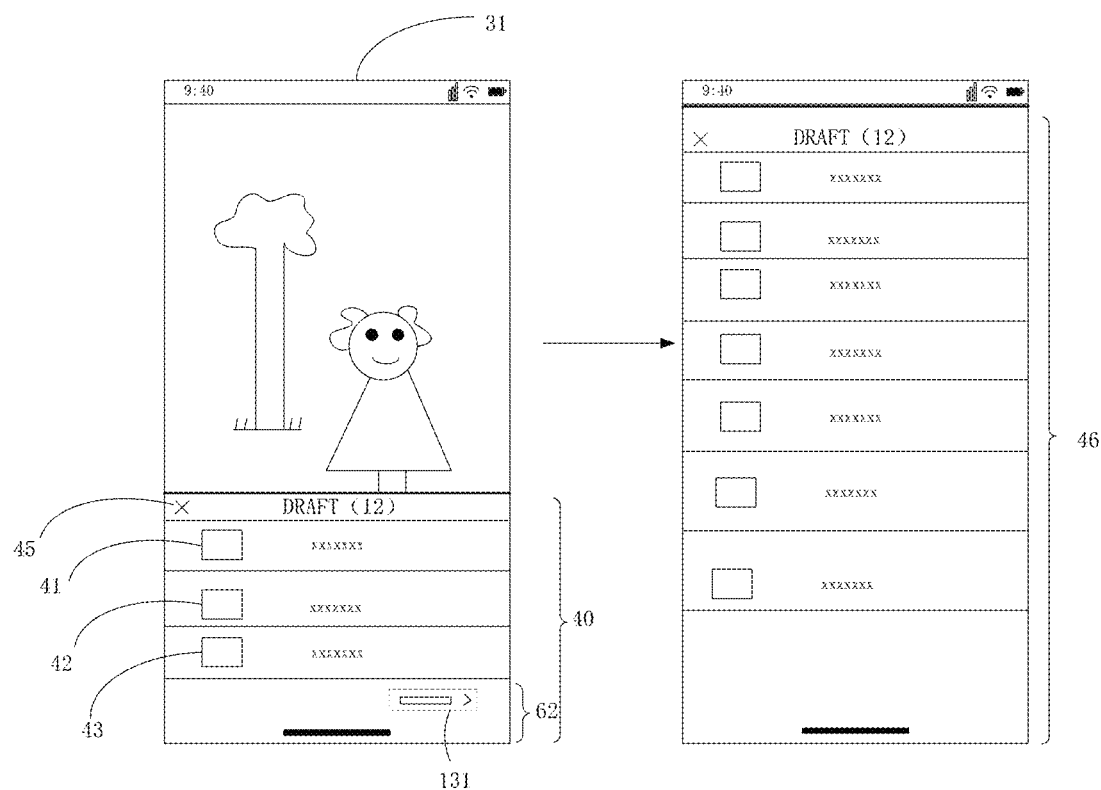
FIG. 13 is a schematic diagram of another user interface in an embodiment of the disclosure.

For example, in foregoing FIGS. 4 to 10, the first list may further include a second icon. For example, as shown in FIG. 13, on the basis of FIG. 5, the first list further includes a second icon 131. The position of the second icon 131 in the first list 40 is not limited here. For example, the second icon 131 may be on the left, right, or middle of a partial area 62 in the first list 40. In addition, the second icon 131 may further include text information, such as "display all drafts". In this case, when all drafts need to be displayed, the user can click the second icon 131. The terminal 21 can display the second list 46 according to the user's click on the second icon 131, and the second list 46 can be used to display identification information of all drafts.

In the case that the second list is displayed in the user interface, in some embodiments, acquiring a publishing instruction for target multimedia data of the one or more pieces of pre-buffered multimedia data according to the identification information comprises: displaying a second page according to an operation of the user on target identification information in the second list, the second page including target multimedia data corresponding to the target identification information and a publish icon of the target multimedia data; receiving a publishing instruction for the target multimedia data according to an operation of the user on the publishing icon of the target multimedia data.

For example, on the basis of FIG. 12 or FIG. 13, the user can also select identification information of any one of the pre-buffered multimedia data displayed in the second list 46, and perform operation on the identification information, for example, a click, a double-click, a long-press, a voice control instruction, a gesture control instruction, etc. Wherein, the identification information operated by the user can be donated as target identification information. The terminal 21 can display a second page according to an operation of the user on the target identification information, the second page including target multimedia data corresponding to the target identification information and a publishing icon of the target multimedia data. The second page is similar to the second page 110 shown in FIG. 11. Further, the terminal 21 can receive a publishing instruction for the target multimedia data according to an operation of the user on the publishing icon, and further publish the target multimedia data to the network according to the publishing instruction. Alternatively, the terminal 21 displays a publishing page according to an operation of the user on the publishing icon, and the publishing page is similar to the publishing page 120 shown in FIG. 11. In the publishing page, the user can set the scope of publishing for the target multimedia data, and set whether the target multimedia data is allowed to be commented, etc. In addition, the publishing page may also include a confirmation button, and the terminal 21 publishes the target multimedia data to the network according to an operation of the user on the confirmation button.

The multimedia data processing method provided by an embodiment of the present disclosure adjusts the size of the first list through an operation of the user on the first list, so that the number of identification information of pre-buffered multimedia data that can be displayed in the first list gradually increases. In addition, a second list can be displayed through the user's continued operation on the first list, and the second list can display identification information of all pre-buffered multimedia data, or the second list is displayed through an operation of the user on a second icon in the first list, so that the user can browse identification information of all pre-buffered multimedia data in the user interface, which further improves the user experience.

On the basis of foregoing embodiments, the first list further comprises: identification information of audio data associated with the one or more pieces of pre-buffered multimedia data.

For example, in this embodiment, the multimedia data may include at least one of video data, image data, and text data. In addition, text data, video data, or image data may also be associated with audio data, which can specifically be music or other types of audio clips. In one feasible implementation, while the camera captures video data or image data, the terminal 21 associates a music in the terminal with video data or image data shot by the camera. For example, the terminal 21 can establish association relationship of identification information of audio data with identification information of video data or identification information of the image data, so that the terminal can play this associated music or audio clip while playing the video data or image data. In another feasible implementation, in a case that a user edits video data or image data, the terminal 21 can prompt the user whether to associate audio data with the video data or image data, or prompt the user whether to update the associated audio data of the video data or image data. Further, the terminal 21 associates the video data or image data with the audio data selected by the user according to the user's setting.

In some embodiments, the first list further comprises: a third icon corresponding to identification information of the audio data, the third icon being used to create new multimedia data based on the audio data, the new multimedia data being associated with the audio data.

Figure 14:
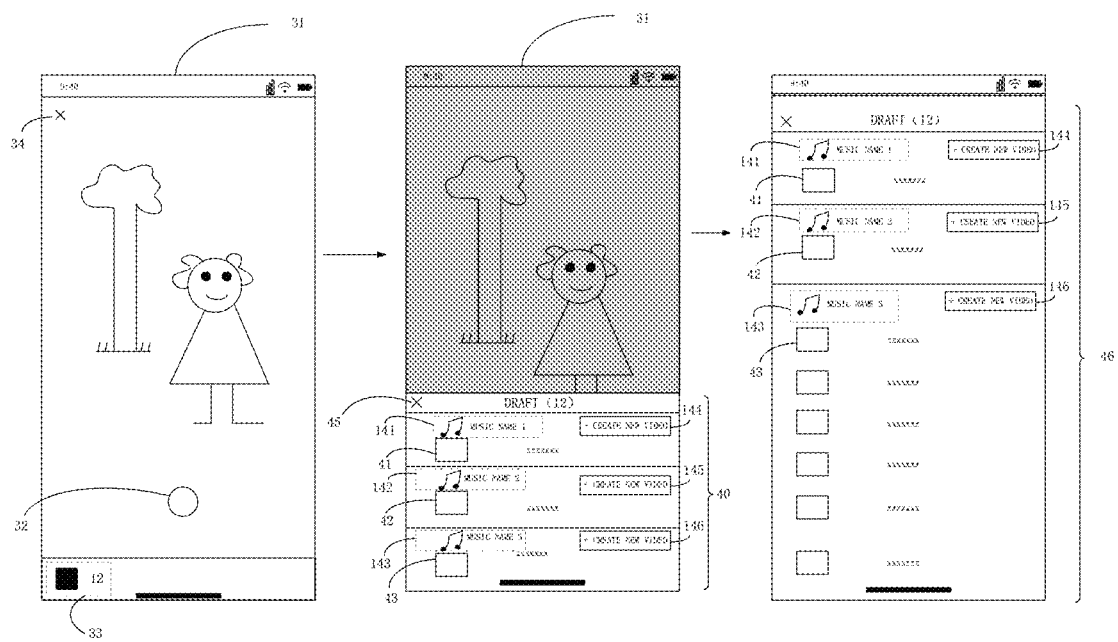
FIG. 14 is a schematic diagram of another user interface in an embodiment of the disclosure.

In some embodiments, in a case that video data or image data is associated with audio data, the first list and/or second list in the foregoing embodiments may also display identification information of the audio data associated with the video data or image data, as well as a third icon corresponding to the identification information of the audio data. As shown in FIG. 14, the terminal 21 displays a first list 40 according to an operation of the user on the first icon 33. The first list 40 includes identification information of three pre-buffered multimedia data, for example, identification information 41 of pre-buffered multimedia data A, identification information 42 of pre-buffered multimedia data B, and identification information 43 of pre-buffered multimedia data C. Wherein, each multimedia data is associated with a piece of music respectively. Accordingly, the identification information 141 of the music associated with the multimedia data A and the third icon 144 corresponding to the identification information 141 are displayed in the first list 40. Similarly, 142 represents identification information of the music associated with the multimedia data B, 145 represents the third icon corresponding to the identification information 142; 143 represents identification information of the music associated with the multimedia data C, and 146 represents the third icon corresponding to the identification information 143. In addition, as shown in FIG. 14, since the sorting order of the identification information of the first three pre-buffered multimedia data in the second list 46 is consistent with the sorting order of the identification information of the three pre-buffered multimedia data in the first list 40, the second list 46 may also include the identification information of the music associated with each multimedia data in the three pre-buffered multimedia data, and corresponding third icon. In addition, in the first list 40 or the second list 46, the same music can be associated with multiple multimedia data. For example, taking the second list 46 as an example, the multimedia data corresponding to the identification information 43 and the multimedia data corresponding to other identification information under the identification information 43 are both associated with the music corresponding to the identification information 143. That is, the music corresponding to the identification information 143 is associated with the multimedia data corresponding to the identification information 43, in addition, the music corresponding to the identification information 143 is also associated with the multimedia data corresponding to other identification information after the identification information 43.

In addition, as shown in FIG. 14, the user can operate the third icon in the first list or the second list. For example, when the user clicks the third icon, the terminal 21 can create new multimedia data, which is associated with the music corresponding to the third icon, according to the click operation of the user on the third icon. For example, when the user clicks the third icon 146, the terminal 21 can create new multimedia data, which is associated with the music corresponding to the identification information 143, according to the click operation of the user on the third icon 146, for example, establish and store an association relationship between the identification information of the new multimedia data and the music name 3. For example, the terminal 21 can create new multimedia data based on the music corresponding to the identification information 143 according to the click operation of the user on the third icon 146. When the new multimedia data is played, the music corresponding to the identification information 143 is simultaneously played, that is, realizing the direct association between the created multimedia data and the music corresponding to the identification information 143. Wherein, the music corresponding to the identification information 143 is the music associated with the music name 3 in FIG. 14. The position settings of the third icon and the identification information corresponding to the audio data in FIG. 14 are only illustrative, and those skilled in the art can adjust relative position relationship between the third icon and the identification information of the audio data according to actual applications and requirements; in addition, in some implementations, the third icon can also be omitted, and the user can create new multimedia data and combine the new multimedia data with the music corresponding to the identification information (for example, identification information 143) of the audio data by an operation on the identification information.

In the multimedia data processing method provided by an embodiment of the present disclosure, by displaying identification information of audio data associated with pre-buffered multimedia data and a third icon corresponding to the identification information in a first list, the terminal 21 can create new multimedia data according to an operation of a user on the third icon as the user conducting the operation, and the new multimedia data can be associated with audio data corresponding to identification information of the audio data, that is, the audio data that has been associated with the multimedia data in a draft list can be associated with the new created multimedia data again, which saves the operation of the user to associate audio data for the new multimedia data, thereby further improving the user experience.

In some embodiments, the second page further comprises: a fourth icon; the method further comprises: displaying a second shooting page according to an operation of the user on the fourth icon, the second shooting page including the target multimedia data and a shooting control button, the shooting control button being used to control generation of new multimedia data, wherein, one feasible implementation is that the shooting control button is used to recreate new multimedia data on the basis of the pre-buffered target multimedia. Another feasible implementation is that the shooting control button is used to control the shooting of new multimedia data.

Figure 15:
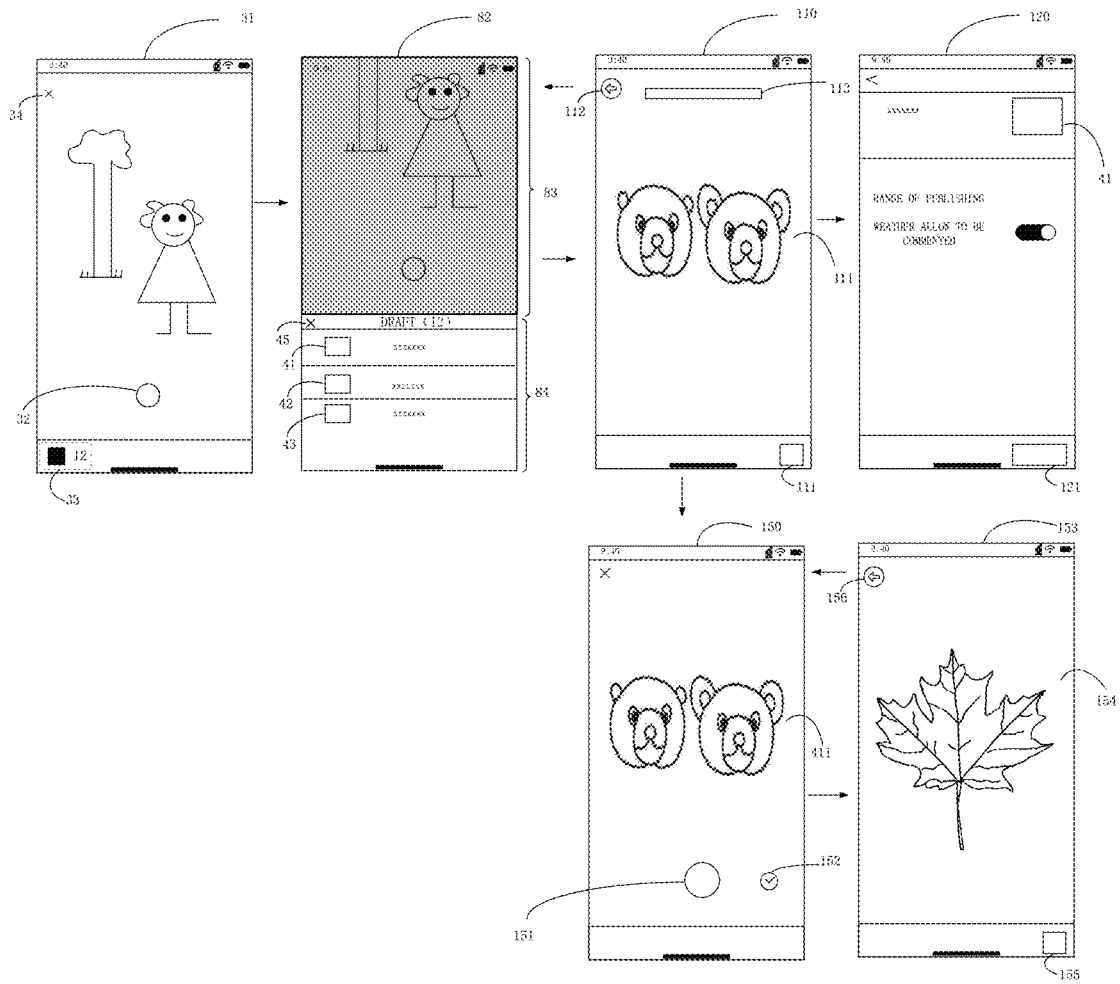
FIG. 15 is a schematic diagram of a user interface in an embodiment of the disclosure.

For example, as shown in FIG. 15, on the basis of FIG. 11, the second page 110 may further include a fourth icon 113, and the fourth icon 113 can be used to continue shooting new video data or image data. For example, the terminal 21 can display the second shooting page 150 according to an operation of the user on the fourth icon 113. The second shooting page 150 may include pre-buffered multimedia data 411, a shooting control button 151, and a shooting control button 152. In one feasible implementation, the terminal 21 can shoot new video data or image data again on the basis of the pre-buffered multimedia data 411 according to an operation of the user on the shooting control button 151, that is, continue to add newly shot video data or image data on the basis of the pre-buffered multimedia data 411, thereby obtaining new multimedia data, that is, the new multimedia data includes the pre-buffered multimedia data 411 and newly shot video data or image data. The position of the newly shot video data or image data in the pre-buffered multimedia data 411 is not limited here. In another feasible implementation, the terminal 21 can shoot new multimedia data according to an operation of the user on the capture control button 151, and the newly shot multimedia data is independent of the pre-buffered multimedia data 411, that is, the new multimedia data does not include the pre-buffered multimedia data 411, for example, the new multimedia data is newly shot video data or image data.

Further, the terminal 21 can stop shooting according to an operation of the user on the shooting control button 152, and display an edit page 153, which may include new multimedia data as described above, here taking new multimedia data being the newly shot video data or image data 154 as an example. In the editing page 153, the user can edit the newly shot video data or image data 154. After editing is completed, the terminal 21 can publish the edited video data or image data 154 to a network according to an operation of the user on the publishing icon 155. Alternatively, after editing is completed, the terminal 21 can, according to an operation of the user on the publishing icon 155, display a page similar to the publishing page 120, which is used to set the range of publishing for the edited video data or image data 154, and whether comments are allowed. Further, the terminal 21 can publish the edited video data or image data 154 to the network according to an operation of the user on a confirmation button in the page. In addition, as shown in FIG. 15, the editing page 153 also includes a return button 156, and the terminal 21 can return back to the second shooting page 150 according to an operation of the user on the return button 156.

In the multimedia data processing method provided by an embodiment of the present disclosure, in a process of sharing a draft in a draft list by a user, a page used to edit the draft can further include a icon for continuing to shoot new video data or images data, and in the case that the user is still not satisfied with the pre-buffered draft, it is possible to continue to create new video data or image data in the page for editing the draft by using this icon, thereby avoiding the necessity for the user to return back to shooting page to create new video data or image data, which further improves the user experience.

Figure 16:
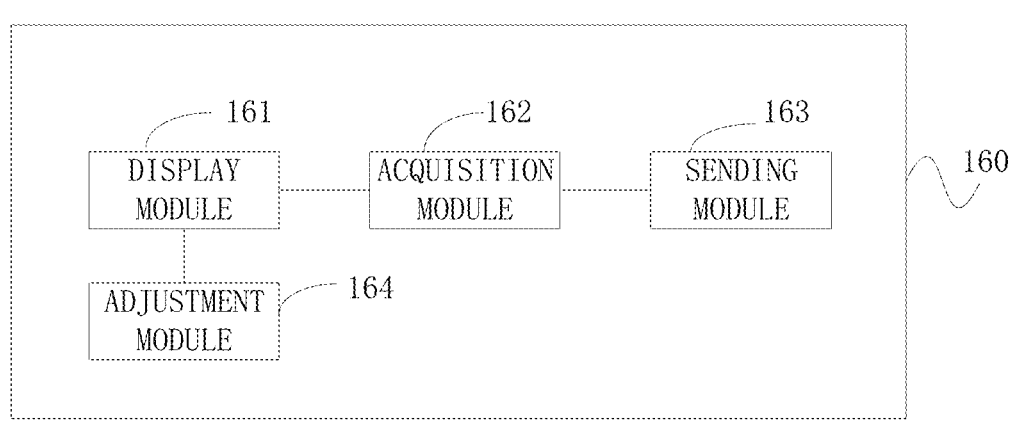
FIG. 16 is a schematic structural diagram of a multimedia data processing apparatus in an embodiment of the disclosure.

FIG. 16 is a schematic structural diagram of a multimedia data processing apparatus in an embodiment of the disclosure. The multimedia data processing apparatus provided by embodiments of the present disclosure can be configured in a client or can be configured in a server. The multimedia data processing apparatus 160 specifically comprises:

a display module 161 for displaying a first shooting page which including a first icon; display identification information of one or more pieces of pre-buffered multimedia data according to an operation of a user on the first icon;

an acquisition module 162 for acquiring a publishing instruction for target multimedia data of the one or more pieces of pre-buffered multimedia data according to the identification information;

a sending module 163 for publishing the target multimedia data to a network in response to the publishing instruction.

In some embodiments, when the display module 161 displays identification information of one or more pieces of pre-buffered multimedia data according to an operation of a user on a first icon, it is specifically used to: display a first list in a first shooting page according to an operation of a user on a first icon, the first list including identification information of the one or more pieces of pre-buffered multimedia data.

In some embodiments, the first list is in a preset area of the first shooting page.

In some embodiments, the first list includes a transparent area or a non-transparent area; or The first list includes a partially transparent area and a partially non-transparent area.

In some embodiments, when the display module 161 displays a first list in a first shooting page according to an operation of a user on a first icon, it is specifically used to: adjust the brightness of the first shooting page according to an operation of the user on the first icon; display the first list in the first shooting page with the brightness adjusted.

In some embodiments, the acquisition module 162 is further used to: acquire a partial page of the first shooting page or perform reduction processing on the first shooting page according to an operation of the user on the first icon; the display module 161 is specifically used to: display a first page, the first page including a first area and a second area, the first area including a partial page of the first shooting page or the reduced first shooting page, and the second area including a first list, the first list including identification information of the one or more pieces of pre-buffered multimedia data.

In some embodiments, when the acquisition module 162 acquires a partial page of the first shooting page or performs reduction processing on the first shooting page according to an operation of the user on the first icon, it is specifically used to: adjust the brightness of the first shooting page according to an operation of the user on the first icon; acquire a partial page of the first shooting page with the brightness adjusted or perform reduction processing on the first shooting page.

In some embodiments, the first icon includes the total amount of pre-buffered multimedia data.

In some embodiments, the first shooting page displays a target image collected by a shooting apparatus.

In some embodiments, the target image changes in real time.

In some embodiments, the first list is used to display identification information of a preset number of pre-buffered multimedia data.

In some embodiments, the first list includes the total amount of pre-buffered multimedia data.

In some embodiments, the display module 161 is specifically used to: display a second page according to an operation of the user on target identification information in the first list, the second page including target multimedia data corresponding to the target identification information and a publish icon of the target multimedia data; the acquisition module 162 is specifically used to: receive a publishing instruction for the target multimedia data according to an operation of the user on the publish icon of the target multimedia data.

In some embodiments, the multimedia data processing apparatus 160 further comprises: an adjustment module 164 for adjusting the size of the first list according to an operation of the user on the first list, the number of identification information of the pre-buffered multimedia data that can be displayed in the first list being positively correlated with the size of the first list.

In some embodiments, the display module 161 is specifically used to: display a second page according to an operation of the user on target identification information in the first list after size adjustment, the second page including target multimedia data corresponding to the target identification information and a publishing icon of the target multimedia data; the acquisition module 162 is specifically used to receive a publishing instruction for the target multimedia data according to an operation of the user on the publishing icon of the target multimedia data.

In some embodiments, the display module 161 is further used to: display a second list according to an operation of the user on the first list, the second list being used to display identification information of all pre-buffered multimedia data.

In some embodiments, the first list includes a second icon; the display module 161 is further used to: display a second list according to an operation of the user on the second icon, the second list being used to display identification information of all the pre-buffered multimedia data.

In some embodiments, the display module 161 is specifically used to: display a second page according to an operation of the user on target identification information in the second list, the second page including target multimedia data corresponding to the target identification information and a publish icon of the target multimedia data; the acquisition module 162 is specifically used to: receive a publishing instruction for the target multimedia data according to an operation of the user on the publish icon of the target multimedia data.

In some embodiments, the multimedia data includes at least one of image data, video data, audio data, and text data.

In some embodiments, the first list further comprises: identification information of audio data associated with the one or more pieces of pre-buffered multimedia data.

In some embodiments, the first list further comprises: a third icon corresponding to identification information of the audio data, the third icon being used to create new multimedia data based on the audio data, the new multimedia data being associated with the audio data.

In some embodiments, the second page further comprises: a fourth icon; the display module 161 is further used to: display a second shooting page according to an operation of the user on the fourth icon, the second shooting page including the target multimedia data and a shooting control button which is used to control the shooting of new multimedia data.

In some embodiments, the sorting order of the multimedia data displayed in the first list and/or the second list is determined according to the chronological order.

The multimedia data processing apparatus provided by an embodiment of the present disclosure can execute the steps performed by a client or a server in the multimedia data processing method provided by the method embodiment of the present disclosure, and specific execution steps and beneficial effects will not be repeated here.

Figure 17:
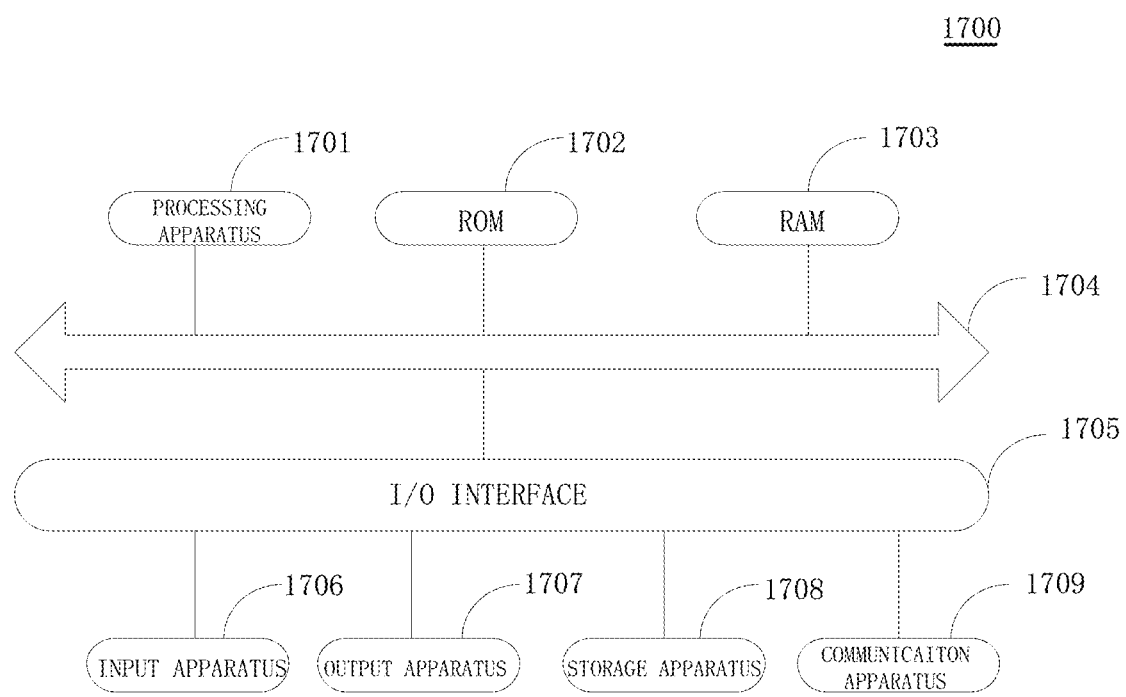
FIG. 17 is a schematic structural diagram of an electronic device in an embodiment of the disclosure.

FIG. 17 is a schematic structural diagram of an electronic device in an embodiment of the disclosure. Referring specifically to FIG. 17 below, it shows a schematic structural diagram suitable for implementing an electronic device 1700 in an embodiment of the present disclosure. The electronic device 1700 in the embodiment of the present disclosure may include but not limited to a mobile terminal such as a mobile phone, a notebook, a digital broadcast receiver, a PDA (Personal Digital Assistant), a PAD (tablet), a PMP (Portable Multimedia Player), a vehicle-mounted terminal (for example, a vehicle-mounted navigation terminal), etc. and a fixed terminal such as a digital TV, a desktop computer, etc. The electronic device shown in FIG. 17 is only one example, and should not bring any limitation to functions and usage scopes of embodiments of the present disclosure.

As shown in FIG. 17, the electronic device 1700 may include a processing apparatus (for example a central processing unit, a graphics processor, etc.) 1701, which can executes various appropriate actions and processes to implement the multimedia data processing method of the embodiment as described in the present disclosure according to a program stored in a read-only memory (ROM) 1702 or a program loaded from a storage 1708 into a random access memory (RAM) 1703. In the RAM 1703, various programs and data required for the operation of the electronic device 1700 are also stored. The processing apparatus 1701, ROM

1702, and RAM 1703 are connected to each other through a bus 1704. An input/output (I/O) interface 1705 is also connected to the bus 1704.

Generally, the following apparatus can be connected to the I/O interface 1705: an input device 1706 including for example, a touch screen, a touch pad, a keyboard, a mouse, a camera, a microphone, an accelerometer, a gyroscope, etc.; an output device 1707 including for example, a liquid crystal display (LCD), a speaker, a vibrator, etc.; a storage 1708 including for example, a magnetic tape, a hard disk, etc.; and a communication apparatus 1709. The communication apparatus 1709 may allow the electronic device 1700 to perform wireless or wired communication with other devices to exchange data. Although FIG. 17 shows an electronic device 1700 having various apparatus, it should be understood that it is not required to implement or have all of the illustrated apparatus. It can alternatively be implemented or provided with more or fewer apparatus.

In particular, according to an embodiment of the present disclosure, the process described above with reference to the flowchart can be implemented as a computer software program. For example, an embodiment of the present disclosure includes a computer program product, which includes a computer program carried on a non-transitory computer readable medium, and the computer program contains program code for executing the method shown in the flowchart. In such an embodiment, the computer program may be downloaded and installed from the network through the communication apparatus 1709, or installed from the storage 1708, or installed from the ROM 1702. When the computer program is executed by the processing apparatus 1701, the above-mentioned functions defined in the method of the embodiment of the present disclosure are executed.

It should be noted that the aforementioned computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. More specific examples of computer-readable storage media may include, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, in which a computer-readable program code is carried. This propagated data signal can take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination thereof.

In some embodiments, the client and server can communicate with any currently known or future developed network protocol such as HTTP (HyperText Transfer Protocol), and can interconnect with digital data communication (for example, communication network)in any form or medium. Examples of communication networks include local area networks ("LAN"), wide area networks ("WAN"), international network (for example, the Internet), and end-to-end networks (for example, ad hoc end-to-end networks), as well as any currently known or future developed networks.

The aforementioned computer-readable medium may be included in aforementioned electronic devices; or it may exist alone without being assembled into the electronic device.

The aforementioned computer-readable medium carries one or more programs, which, when executed by the electronic device, cause the electronic device to perform following operations:

displaying a first shooting page which includes a first icon;

displaying identification information of one or more pieces of pre-buffered multimedia data according to an operation of a user on the first icon;

acquiring a publishing instruction for target multimedia data of the one or more pieces of pre-buffered multimedia data according to the identification information;

in response to the publishing instruction, publishing the target multimedia data to a network.

In some embodiments, when one or more of foregoing programs are executed by the electronic device, the electronic device can also execute other steps described in foregoing embodiments.

The computer program code for performing the operations of the present disclosure can be written in one or more programming languages or a combination thereof. The aforementioned programming languages include but are not limited to object-oriented programming languages such as Java, Smalltalk, C++, and include conventional procedural programming languages such as "C" language or similar programming languages. The program code can be executed entirely on a user's computer, partly executed on a user's computer, executed as an independent software package, partly executed on a user's computer and partly executed on a remote computer, or entirely executed on a remote computer or server. In the case of involving a remote computer, the remote computer can be connected to a user's computer through any kind of network, including a local area network (LAN) or a wide area network (WAN), or it can be connected to an external computer (for example, connected by using Internet provided by an Internet service provider).

The flowcharts and block diagrams in the accompanying drawings illustrate possible architecture, function, and operation implementations of a system, method, and computer program product according to various embodiments of the present disclosure. In this regard, each block in a flowchart or block diagram may represent a module, program segment, or part of code, which contains one or more executable instructions for realizing specified logic functions. It should also be noted that, in some alternative implementations, functions marked in a block may also occur in a different order than the order marked in the drawings. For example, two blocks shown in succession can actually be executed substantially in parallel, and they can sometimes be executed in the reverse order, depending on functions involved. It should also be noted that each block in a block diagram and/or flowchart, and the combination of blocks in a block diagram and/or flowchart, can be implemented by a dedicated hardware-based system that performs the specified functions or operations, or it can be implemented by a combination of dedicated hardware and computer instructions.

The units involved in the embodiments of the present disclosure can be implemented in software or hardware. Wherein, the name of the unit does not constitute a limitation on the unit itself under certain circumstances.

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of machine-readable storage media may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, the present disclosure provides a multimedia data processing method, comprising:

displaying a first shooting page which includes a first icon;

displaying identification information of one or more pieces of pre-buffered multimedia data according to an operation of a user on the first icon;

acquiring a publishing instruction for target multimedia data of the one or more pieces of pre-buffered multimedia data according to the identification information; and in response to the publishing instruction, publishing the target multimedia data to a network.

According to one or more embodiments of the present disclosure, in the multimedia data processing method provided by the present disclosure, the displaying identification information of one or more pieces of pre-buffered multimedia data according to an operation of a user on a first icon, comprises:

displaying a first list in the first shooting page according to the operation of the user on the first icon, the first list including the identification information of the one or more pieces of pre-buffered multimedia data.

According to one or more embodiments of the present disclosure, in the multimedia data processing method provided by the present disclosure, the first list is in a preset area of the first shooting page.

According to one or more embodiments of the present disclosure, in the multimedia data processing method provided by the present disclosure, the first list includes a transparent area or a non-transparent area; or the first list includes a partially transparent area and a partially non-transparent area.

According to one or more embodiments of the present disclosure, in the multimedia data processing method provided by the present disclosure, the displaying a first list in the first shooting page according to an operation of a user on the first icon, comprises:

adjusting brightness of the first shooting page according to the operation of the user on the first icon; and displaying the first list in the first shooting page with the brightness adjusted.

According to one or more embodiments of the present disclosure, in the multimedia data processing method provided by the present disclosure, the displaying identification information of one or more pieces of pre-buffered multimedia data according to an operation of a user on a first icon, comprises:

acquiring a partial page of the first shooting page or performing reduction processing on the first shooting page according to the operation of the user on the first icon; and displaying the first page, the first page including a first area and a second area, the first area including the partial page of the first shooting page or the first shooting page after the reduction processing, the second area including a first list, the first list including the identification information of the one or more pieces of pre-buffered multimedia data.

According to one or more embodiments of the present disclosure, in the multimedia data processing method provided by the present disclosure, acquiring a partial page of the first shooting page or performing reduction processing on the first shooting page according to the operation of the user on the first icon, comprises:

adjusting the brightness of the first shooting page according to the operation of the user on the first icon; and acquiring the partial page of the first shooting page with the brightness adjusted or performing reduction processing on the first shooting page.

According to one or more embodiments of the present disclosure, in the multimedia data processing method provided by the present disclosure, the first icon includes the total amount of the pre-buffered multimedia data.

According to one or more embodiments of the present disclosure, in the multimedia data processing method provided by the present disclosure, the first shooting page displays a target image collected by a shooting apparatus.

According to one or more embodiments of the present disclosure, in the multimedia data processing method provided by the present disclosure, the target image changes in real time.

According to one or more embodiments of the present disclosure, in the multimedia data processing method provided by the present disclosure, the first list is used to display identification information of a preset number of pre-buffered multimedia data.

According to one or more embodiments of the present disclosure, in the multimedia data processing method provided by the present disclosure, the first list includes the total amount of the pre-buffered multimedia data.

According to one or more embodiments of the present disclosure, in the multimedia data processing method provided by the present disclosure, the acquiring a publishing instruction for target multimedia data of the one or more pieces of pre-buffered multimedia data according to the identification information comprises:

displaying a second page according to an operation of a user on target identification information in the first list, the second page including the target multimedia data corresponding to the target identification information and a publishing icon of the target multimedia data; and receiving a publishing instruction for the target multimedia data according to an operation of the user on the publishing icon of the target multimedia data.

According to one or more embodiments of the present disclosure, in the multimedia data processing method provided by the present disclosure, the method further comprises:

adjusting the size of the first list according to an operation of a user on the first list, the number of identification information of the pre-buffered multimedia data that can be displayed in the first list being positively correlated with the size of the first list.

According to one or more embodiments of the present disclosure, in the multimedia data processing method provided by the present disclosure, the acquiring a publishing instruction for target multimedia data of the one or more pieces of pre-buffered multimedia data according to the identification information comprises:

displaying a second page according to an operation of the user on the target identification information in the first list which size has been adjusted, the second page including target multimedia data corresponding to the target identification information and a publishing icon of the target multimedia data; and receiving a publishing instruction for the target multimedia data according to an operation of the user on the publishing icon of the target multimedia data.

According to one or more embodiments of the present disclosure, in the multimedia data processing method provided by the present disclosure, the method further comprises:

displaying a second list according to an operation of the user on the first list, the second list being used to display identification information of all pre-buffered multimedia data.

According to one or more embodiments of the present disclosure, in the multimedia data processing method provided by the present disclosure, the first list includes a second icon; the method further comprises:

displaying a second list according to an operation of the user on the second icon, the second list being used to display identification information of all pre-buffered multimedia data.

According to one or more embodiments of the present disclosure, in the multimedia data processing method provided by the present disclosure, the acquiring a publishing instruction for target multimedia data of the one or more pieces of pre-buffered multimedia data according to the identification information comprises:

displaying a second page according to an operation of the user on target identification information in the second list, the second page including target multimedia data corresponding to the target identification information and a publish icon of the target multimedia data; and receiving a publishing instruction for the target multimedia data according to an operation of the user on the publishing icon of the target multimedia data.

According to one or more embodiments of the present disclosure, in the multimedia data processing method provided by the present disclosure, the multimedia data includes at least one of image data, video data, audio data, and text data.

According to one or more embodiments of the present disclosure, in the multimedia data processing method provided by the present disclosure, the first list further comprises: identification information of audio data associated with the one or more pieces of pre-buffered multimedia data.

According to one or more embodiments of the present disclosure, in the multimedia data processing method provided by the present disclosure, the first list further comprises: a third icon corresponding to identification information of the audio data, the third icon being used to create new multimedia data based on the audio data, the new multimedia data being associated with the audio data.

According to one or more embodiments of the present disclosure, in the multimedia data processing method provided by the present disclosure, the second page further includes a fourth icon; the method further comprises:

displaying a second shooting page according to an operation of the user on the fourth icon, the second shooting page including the target multimedia data and a shooting control button which is used to control the shooting of new multimedia data.

According to one or more embodiments of the present disclosure, in the multimedia data processing method provided by the present disclosure, the sorting order of the multimedia data displayed in the first list and/or the second list is determined according to the chronological order.

According to one or more embodiments of the present disclosure, the present disclosure provides a multimedia data processing apparatus, comprising:

a display module for displaying a first shooting page which includes a first icon; display identification information of one or more pieces of pre-buffered multimedia data according to an operation of a user on the first icon;

an acquisition module for acquiring a publishing instruction for target multimedia data of the one or more pieces of pre-buffered multimedia data according to the identification information; and a sending module for publishing the target multimedia data to a network in response to the publishing instruction.

According to one or more embodiments of the present disclosure, in the multimedia data processing apparatus provided by the present disclosure, when the display module displays identification information of one or more pieces of pre-buffered multimedia data according to an operation of a user on a first icon, it is specifically used to: display a first list in a first shooting page according to an operation of a user on a first icon, the first list including identification information of the one or more pieces of pre-buffered multimedia data.

According to one or more embodiments of the present disclosure, in the multimedia data processing apparatus provided by the present disclosure, the first list is in a preset area of the first shooting page.

According to one or more embodiments of the present disclosure, in the multimedia data processing apparatus provided by the present disclosure, the first list includes a transparent area or a non-transparent area; or the first list includes a partially transparent area and a partially non-transparent area.

According to one or more embodiments of the present disclosure, in the multimedia data processing apparatus provided by the present disclosure, when the display module displays a first list in a first shooting page according to an operation of a user on a first icon, it is specifically used to: adjust the brightness of the first shooting page according to an operation of the user on the first icon; display the first list in the first shooting page with the brightness adjusted.

According to one or more embodiments of the present disclosure, in the multimedia data processing apparatus provided by the present disclosure, the acquisition module is further used to: acquire a partial page of the first shooting page or perform reduction processing on the first shooting page according to an operation of the user on the first icon; the display module is specifically used to: display a first page, the first page including a first area and a second area, the first area including a partial page of the first shooting page or the reduced first shooting page, and the second area including a first list, the first list including identification information of the one or more pieces of pre-buffered multimedia data.

According to one or more embodiments of the present disclosure, in the multimedia data processing apparatus provided by the present disclosure, when the acquisition module acquires a partial page of the first shooting page or performs reduction processing on the first shooting page according to an operation of the user on the first icon, it is specifically used to: adjust the brightness of the first shooting page according to an operation of the user on the first icon; acquire a partial page of the first shooting page with the brightness adjusted or perform reduction processing on the first shooting page.

According to one or more embodiments of the present disclosure, in the multimedia data processing apparatus provided by the present disclosure, the first icon includes the total amount of the pre-buffered multimedia data.

According to one or more embodiments of the present disclosure, in the multimedia data processing apparatus provided by the present disclosure, the first shooting page displays a target image collected by a shooting apparatus.

According to one or more embodiments of the present disclosure, in the multimedia data processing apparatus provided by the present disclosure, the target image changes in real time.

According to one or more embodiments of the present disclosure, in the multimedia data processing apparatus provided by the present disclosure, the first list is used to display identification information of a preset number of pre-buffered multimedia data.

According to one or more embodiments of the present disclosure, in the multimedia data processing apparatus provided by the present disclosure, the first list includes the total amount of the pre-buffered multimedia data.

According to one or more embodiments of the present disclosure, in the multimedia data processing apparatus provided in the present disclosure, the display module is specifically used to: display a second page according to an operation of the user on target identification information in the first list, the second page including target multimedia data corresponding to the target identification information and a publish icon of the target multimedia data; the acquisition module is specifically used to: receive a publishing instruction for the target multimedia data according to an operation of the user on the publish icon of the target multimedia data.

According to one or more embodiments of the present disclosure, in the multimedia data processing apparatus provided by the present disclosure, the multimedia data processing apparatus further comprises: an adjustment module for adjusting the size of the first list according to an operation of the user on the first list, the number of identification information of the pre-buffered multimedia data that can be displayed in the first list being positively correlated with the size of the first list.

According to one or more embodiments of the present disclosure, in the multimedia data processing apparatus provided in the present disclosure, the display module is specifically used to: display a second page according to an operation of the user on target identification information in the first list after size adjustment, the second page including target multimedia data corresponding to the target identification information and a publishing icon of the target multimedia data; the acquisition module is specifically used to receive a publishing instruction for the target multimedia data according to an operation of the user on the publishing icon of the target multimedia data.

According to one or more embodiments of the present disclosure, in the multimedia data processing apparatus provided by the present disclosure, the display module is further used to: display a second list according to an operation of the user on the first list, the second list being used to display identification information of all pre-buffered multimedia data.

According to one or more embodiments of the present disclosure, in the multimedia data processing apparatus provided by the present disclosure, the first list includes a second icon; the display module is further used to: display a second list according to an operation of the user on the second icon, the second list being used to display identification information of all the pre-buffered multimedia data.

According to one or more embodiments of the present disclosure, in the multimedia data processing apparatus provided by the present disclosure, the display module is specifically used to: display a second page according to an operation of the user on target identification information in the second list, the second page including target multimedia data corresponding to the target identification information and a publish icon of the target multimedia data; the acquisition module is specifically used to: receive a publishing instruction for the target multimedia data according to an operation of the user on the publish icon of the target multimedia data.

According to one or more embodiments of the present disclosure, in the multimedia data processing apparatus provided by the present disclosure, the multimedia data includes at least one of image data, video data, audio data, and text data.

According to one or more embodiments of the present disclosure, in the multimedia data processing apparatus provided by the present disclosure, the first list further comprises: identification information of audio data associated with the one or more pieces of pre-buffered multimedia data.

According to one or more embodiments of the present disclosure, in the multimedia data processing apparatus provided by the present disclosure, the first list further comprises: a third icon corresponding to identification information of the audio data, the third icon being used to create new multimedia data based on the audio data, the new multimedia data being associated with the audio data.

According to one or more embodiments of the present disclosure, in the multimedia data processing apparatus provided by the present disclosure, the second page further comprises: a fourth icon; the display module is further used to: display a second shooting page according to an operation of the user on the fourth icon, the second shooting page including the target multimedia data and a shooting control button which is used to control the shooting of new multimedia data.

According to one or more embodiments of the present disclosure, in the multimedia data processing apparatus provided by the present disclosure, the sorting order of the multimedia data displayed in the first list and/or the second list is determined according to the chronological order.

According to one or more embodiments of the present disclosure, the present disclosure provides an electronic device comprising:

one or more processors; and a memory, used to store one or more programs;

the one or more programs, when executed by the one or more processors, causing the one or more processors to implement any one of the multimedia data processing methods provided in the present disclosure.

According to one or more embodiments of the present disclosure, the present disclosure provides a computer-readable storage medium having a computer program stored thereon which, when executed by a processor, implements any one of the multimedia data processing methods provided in the present disclosure.

According to one or more embodiments of the present disclosure, the present disclosure provides a computer program comprising instructions which, when executed by a processor, cause the processor to execute one or more steps in any one of the multimedia data processing methods provided in the present disclosure.

According to one or more embodiments of the present disclosure, the present disclosure provides a computer program product comprising instructions which, when executed by a processor, cause the processor to execute one or more steps in any one of the multimedia data processing methods provided in the present disclosure.

The above description is only preferred embodiments of the present disclosure and an explanation to the technical principles applied. Those skilled in the art should understand that the scope of disclosure involved in this disclosure is not limited to technical solutions formed by specific combination of above technical features, and should also cover other technical solutions formed by arbitrarily combining above technical features or equivalent features thereof without departing from above disclosed concept. For example, those technical solutions formed by exchanging of above features and technical features disclosed in the present disclosure (but not limited to) having similar functions with each other.

In addition, although various operations are depicted in a specific order, this should not be understood as requiring these operations to be performed in the specific order shown or performed in a sequential order. Under certain circumstances, multitasking and parallel processing may be advantageous. Likewise, although several specific implementation details are included in above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in a language specific to structural features and/or logical actions of the method, it should be understood that the subject matter defined in the appended claims is not necessarily limited to the specific features or actions described above. Rather, the specific features and actions described above are merely exemplary forms of implementing the claims.

What is claimed is:

1. A multimedia data processing method, comprising:
   displaying a first shooting page which includes a first icon which is a draft browsing entrance, wherein the first shooting page displays a target image collected by a shooting apparatus;
   displaying identification information of one or more pieces of pre-buffered multimedia data according to an operation of a user on the first icon, wherein the one or more pieces of pre-buffered multimedia data are one or more drafts that have not been published;
   acquiring a publishing instruction for target multimedia data of the one or more pieces of pre-buffered multimedia data according to the identification information; and
   in response to the publishing instruction, publishing the target multimedia data to a network.

2. The multimedia data processing method according to claim 1, wherein the displaying identification information of one or more pieces of pre-buffered multimedia data according to an operation of a user on a first icon comprises:
   displaying a first list in the first shooting page according to the operation of the user on the first icon, the first list including the identification information of the one or more pieces of pre-buffered multimedia data.

3. The multimedia data processing method according to claim 2, wherein the first list is in a preset area of the first shooting page.

4. The multimedia data processing method according to claim 3, wherein the first list includes a transparent area or a non-transparent area; or the first list includes a partially transparent area and a partially non-transparent area.

5. The multimedia data processing method according to claim 2, wherein the displaying a first list in the first shooting page according to an operation of a user on the first icon comprises:
   adjusting brightness of the first shooting page according to the operation of the user on the first icon; and
   displaying the first list in the first shooting page with the brightness adjusted.

6. The multimedia data processing method according to claim 2, wherein the acquiring a publishing instruction for target multimedia data of the one or more pieces of pre-buffered multimedia data according to the identification information comprises:
   displaying a second page according to an operation of a user on target identification information in the first list, the second page including the target multimedia data corresponding to the target identification information and a publishing icon of the target multimedia data; and
   receiving a publishing instruction for the target multimedia data according to an operation of the user on the publishing icon of the target multimedia data.

7. The multimedia data processing method according to claim 6, wherein the second page further includes a fourth icon; and the multimedia data processing method further comprises:
   displaying a second shooting page according to an operation of the user on the fourth icon, the second shooting page including the target multimedia data and a shooting control button which is used to control shooting of new multimedia data.

8. The multimedia data processing method according to claim 2, further comprising:
   adjusting a size of the first list according to an operation of a user on the first list, a number of the identification information of the pre-buffered multimedia data that can be displayed in the first list being positively correlated with the size of the first list.

9. The multimedia data processing method according to claim 2, wherein the first list includes a second icon; the multimedia data processing method further comprises:
displaying a second list according to an operation of the user on the second icon, the second list being used to display the identification information of all the pre-buffered multimedia data.

10. The multimedia data processing method according to claim 2, wherein the first list further comprises: identification information of audio data associated with the one or more pieces of pre-buffered multimedia data.

11. The multimedia data processing method according to claim 10, wherein the first list further comprises: a third icon corresponding to the identification information of the audio data, the third icon being used to create new multimedia data based on the audio data, the new multimedia data being associated with the audio data.

12. The multimedia data processing method according to claim 1, wherein the displaying identification information of one or more pieces of pre-buffered multimedia data according to an operation of a user on a first icon comprises:
acquiring a partial page of the first shooting page or performing reduction processing on the first shooting page according to the operation of the user on the first icon; and
displaying the first page, the first page including a first area and a second area, the first area including the partial page of the first shooting page or the first shooting page after the reduction processing, the second area including a first list, the first list including the identification information of the one or more pieces of pre-buffered multimedia data.

13. The multimedia data processing method according to claim 1, wherein the first icon includes a total amount of the pre-buffered multimedia data.

14. The multimedia data processing method according to claim 1, wherein the target image changes in real time.

15. The multimedia data processing method according to claim 1, wherein the multimedia data includes at least one of image data, video data, audio data, and text data.

16. An electronic device, comprising:
one or more processors; and
a storage for storing one or more programs which, when executed by the one or more processors, cause the one or more processors to:
display a first shooting page which includes a first icon which is a draft browsing entrance, wherein the first shooting page displays a target image collected by a shooting apparatus;
display identification information of one or more pieces of pre-buffered multimedia data according to an operation of a user on the first icon, wherein the one or more pieces of pre-buffered multimedia data are one or more drafts that have not been published;
acquire a publishing instruction for target multimedia data of the one or more pieces of pre-buffered multimedia data according to the identification information; and
in response to the publishing instruction, publish the target multimedia data to a network.

17. A non-transitory computer-readable storage medium having a computer program stored thereon which, when executed by a processor, causes the processor to:
display a first shooting page which includes a first icon which is a draft browsing entrance, wherein the first shooting page displays a target image collected by a shooting apparatus;
display identification information of one or more pieces of pre-buffered multimedia data according to an operation of a user on the first icon, wherein the one or more pieces of pre-buffered multimedia data are one or more drafts that have not been published;
acquire a publishing instruction for target multimedia data of the one or more pieces of pre-buffered multimedia data according to the identification information; and
in response to the publishing instruction, publish the target multimedia data to a network.

* * * * *